US011805259B2

(12) United States Patent
Zhang et al.

(10) Patent No.: US 11,805,259 B2
(45) Date of Patent: Oct. 31, 2023

(54) NON-AFFINE BLOCKS PREDICTED FROM AFFINE MOTION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/209,410

(22) Filed: Mar. 23, 2021

(65) Prior Publication Data

US 2021/0211679 A1    Jul. 8, 2021

Related U.S. Application Data

(63) Continuation of application No. PCT/IB2019/058029, filed on Sep. 23, 2019.

(30) Foreign Application Priority Data

Sep. 23, 2018 (WO) ................ PCT/CN2018/107165

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/117* (2014.11);
(Continued)

(58) Field of Classification Search
CPC .. H04N 19/105; H04N 19/117; H04N 19/137; H04N 19/176; H04N 19/51; H04N 19/513; H04N 19/80
See application file for complete search history.

(56) References Cited

U.S. PATENT DOCUMENTS 10,448,010 B2   10/2019 Chen et al.
10,560,712 B2   2/2020 Zou et al.
(Continued)

FOREIGN PATENT DOCUMENTS

CN    105163116 A    12/2015
CN    106537915 A    3/2017
(Continued)

OTHER PUBLICATIONS

Bordes et al. "Description of SDR, HDR and 360 degree Video Coding Technology Proposal by Qualcomm and Technicolor—Medium Complexity Version," Joint Video Experts Team (JVET) of ITU-T SG 16 WP 3 and ISO/IEC JTC 1/SC 29/Wg 11, 10th meeting, San Diego, US, Apr. 10-20, 2018, document JVET-J0022, 2018.

(Continued)

*Primary Examiner* — Jessica M Prince
(74) *Attorney, Agent, or Firm* — Perkins Coie LLP

(57) ABSTRACT

A method, a video processing apparatus and computer-readable program medium for video process is disclosed. The method of video coding including: using, during a conversion between a current block of video and a bitstream representation of the current block, an affine motion mode for the current block; updating motion information of the current block after motion compensation so as to obtain updated motion information of the current block; and using (Continued)

the updated motion information during conversion of subsequent video blocks and their respective bitstream representations.

11 Claims, 22 Drawing Sheets

(51) Int. Cl.
*H04N 19/117* (2014.01)
*H04N 19/176* (2014.01)
*H04N 19/513* (2014.01)
*H04N 19/80* (2014.01)

(52) U.S. Cl.
CPC ......... *H04N 19/176* (2014.11); *H04N 19/513* (2014.11); *H04N 19/80* (2014.11)

(56) References Cited

U.S. PATENT DOCUMENTS

| | | | |
|---|---|---|---|
| 10,757,417 B2 | 8/2020 | Zhang et al. | |
| 10,778,999 B2 | 9/2020 | Li et al. | |
| 10,841,609 B1 | 11/2020 | Lu et al. | |
| 2017/0332095 A1 | 11/2017 | Zou et al. | |
| 2018/0070102 A1 | 3/2018 | Zhang et al. | |
| 2018/0192069 A1* | 7/2018 | Chen | H04N 19/176 |
| 2018/0270500 A1 | 9/2018 | Li et al. | |
| 2019/0058896 A1* | 2/2019 | Huang | H04N 19/159 |
| 2019/0082191 A1* | 3/2019 | Chuang | H04N 19/513 |
| 2019/0387250 A1 | 12/2019 | Boyce et al. | |
| 2020/0045310 A1 | 2/2020 | Chen et al. | |
| 2020/0145688 A1 | 5/2020 | Zou et al. | |
| 2020/0195956 A1* | 6/2020 | Robert | H04N 19/52 |
| 2020/0213594 A1 | 7/2020 | Liu et al. | |
| 2020/0213612 A1 | 7/2020 | Liu et al. | |
| 2020/0359029 A1 | 11/2020 | Liu et al. | |
| 2020/0382771 A1 | 12/2020 | Liu et al. | |
| 2020/0382795 A1 | 12/2020 | Zhang et al. | |
| 2020/0396453 A1 | 12/2020 | Zhang et al. | |
| 2020/0396465 A1 | 12/2020 | Zhang et al. | |

FOREIGN PATENT DOCUMENTS

| | | | |
|---|---|---|---|
| EP | 3422719 A1 | 1/2019 | |
| KR | 20170100214 A | 9/2017 | |
| WO | 2017146526 A1 | 8/2017 | |
| WO | 2017156705 A1 | 9/2017 | |
| WO | 2018126163 A1 | 7/2018 | |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
JEM-7.0: https://jvet.hhi.fraunhofer.de/svn/svn_HMJEMSoftware/tags/HM-16.6-JEM-7.0.
Hsu et al. "Description of SDR Video Coding Technology Proposal by Mediatek," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0018, 2018.
H.265/HEVC, https://www.itu.int/rec/T-REC-H.265.
Zhang et al. "Merge Mode for Deformable Block Motion Information Derivation," IEEE Transaction on Circuits and Systems for Video Technology, Nov. 1, 2017, Institute of Electrical and Electronics Engineers, 27(11):2437 2449.
Zheng et al. "Projection Deformation Based Motion Compensation for Panoramic Video," 2018 IEEE International Symposium on Circuits and Systems (ISCAS), IEEE, May 27, 2018, pp. 1-5.
International Search Report and Written Opinion from International Patent Application No. PCT/IB2019/058029 dated Nov. 25, 2019 (17 pages).
International Search Report and Written Opinion from International Patent Application No. PCT/IB2019/058030 dated Jan. 23, 2020 (20 pages).

* cited by examiner

1300 using (1302), during a conversion between a current block of video and a bitstream representation of the current block, affine model for the current block; wherein the affine model uses a representative point which is shifted from a center of a sub-block within the current block

FIG. 13

NON-AFFINE BLOCKS PREDICTED FROM AFFINE MOTION

CROSS-REFERENCE TO RELATED APPLICATION

This application is a continuation of International Application No. PCT/162019/058029 filed on Sep. 23, 2019, which claims the priority to and benefits of International Patent Application No. PCT/CN2018/107165, filed on Sep. 23, 2018. The entire disclosures of all the aforementioned patent applications are incorporated by reference as part of the disclosure of this application.

TECHNICAL FIELD

This patent document relates to video coding techniques, devices and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

This document discloses methods, systems, and devices related to the use of affine and non-affine motion compensation in video coding and decoding.

In one example aspect, a method of video coding or decoding is disclosed. The method includes using, during a conversion between a current block of video and a bitstream representation of the current block, an affine motion mode for the current block, determining, for a portion of the current block, updated motion information of the current block after motion compensation, and using the updated motion information during conversion of subsequent video blocks and their respective bitstream representations.

In another example aspect, a method of video processing is disclosed. The method includes deriving, during a conversion between a current block of video and a bitstream representation of the current block, motion vector prediction for a non-affine mode of the current block, and performing the conversion using the non-affine mode of the current block. The non-affine mode is derived from a neighbouring affine coded block based on an affine mode.

In yet another example aspect, a method of video processing is disclosed. The method includes using, during a conversion between a current block of video and a bitstream representation of the current block, affine coding mode for the current block. The affine mode uses an off-center presentative point from the current block.

In yet another example aspect, a method of video processing is disclosed. The method includes using, during a conversion between a current block of video and a bitstream representation of the current block, a first motion candidate fetched from an affine coded block uses a different way from a second motion candidate fetched from a non-affine coded block, and performing the conversion using the first motion candidate or the second motion candidate.

In another example aspect, a method for video processing is disclosed. The method includes using, during a conversion between a current block of video and a bitstream representation of the current block, a motion vector prediction (MVP) candidate list and an affine merge candidate list, and performing the conversion using the MVP candidate list or the affine merge candidate list.

In another example aspect, a method for video processing is disclosed. The method includes using, during a conversion between a current block of video and a bitstream representation of the current block, an affine motion mode for the current block; updating motion information of the current block after motion compensation so as to obtain updated motion information of the current block; and using the updated motion information during conversion of subsequent video blocks and their respective bitstream representations.

In another example aspect, a method for video processing is disclosed. The method includes deriving, during a conversion between a current block of video and a bitstream representation of the current block, motion vector prediction for a non-affine mode of the current block, wherein the motion vector prediction for the non-affine mode is derived from a neighbouring affine coded block based on an affine model; and performing the conversion using the motion vector prediction for the non-affine mode of the current block.

In another example aspect, a method for video processing is disclosed. The method includes using, during a conversion between a current block of video and a bitstream representation of the current block, affine model for the current block; wherein the affine model uses a representative point which is shifted from a center of a sub-block within the current block.

In another example aspect, a method for video processing is disclosed. The method includes using, during a conversion between a current block of video and a bitstream representation of the current block, a first motion candidate fetched from an affine coded block in a different way from a second motion candidate fetched from a non-affine coded block; and performing the conversion using the first motion candidate or the second motion candidate.

In another example aspect, a method for video processing is disclosed. The method includes using, during a conversion between a current block of video and a bitstream representation of the current block, an affine motion vector prediction candidate list and/or an affine merge candidate list; and wherein the motion vector prediction candidate list and/or the affine merge candidate list has an adaptive size.

In another example aspect, a method for video processing is disclosed. The method includes deriving, during a conversion between a current block of video and a bitstream representation of the current block, motion vector stored in a sub-block located at one or multiple boundaries of the current block; and performing the conversion using the motion vector stored in the sub-block.

In another example aspect, a video decoder apparatus that implements the above-described video decoding method is disclosed.

In yet another aspect, a video encoder apparatus including one or more processors configured to implement the above-disclosed method is disclosed.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the

BRIEF DESCRIPTION OF THE DRAWINGS

FIG. 13 is a flowchart for another example method of video processing.

DETAILED DESCRIPTION

The present document provides several techniques that can be embodied into digital video encoders and decoders. Section headings are used in the present document for clarity of understanding and do not limit scope of the techniques and embodiments disclosed in each section only to that section.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

1. Summary

This invention is related to video/image coding technologies. Specifically, it is related to motion vector prediction in video/image coding. It may be applied to the existing video coding standard like HEVC, or the standard (Versatile Video Coding) to be finalized. It may be also applicable to future video/image coding standards or video/image codec.

2. Introduction

Figure 1:
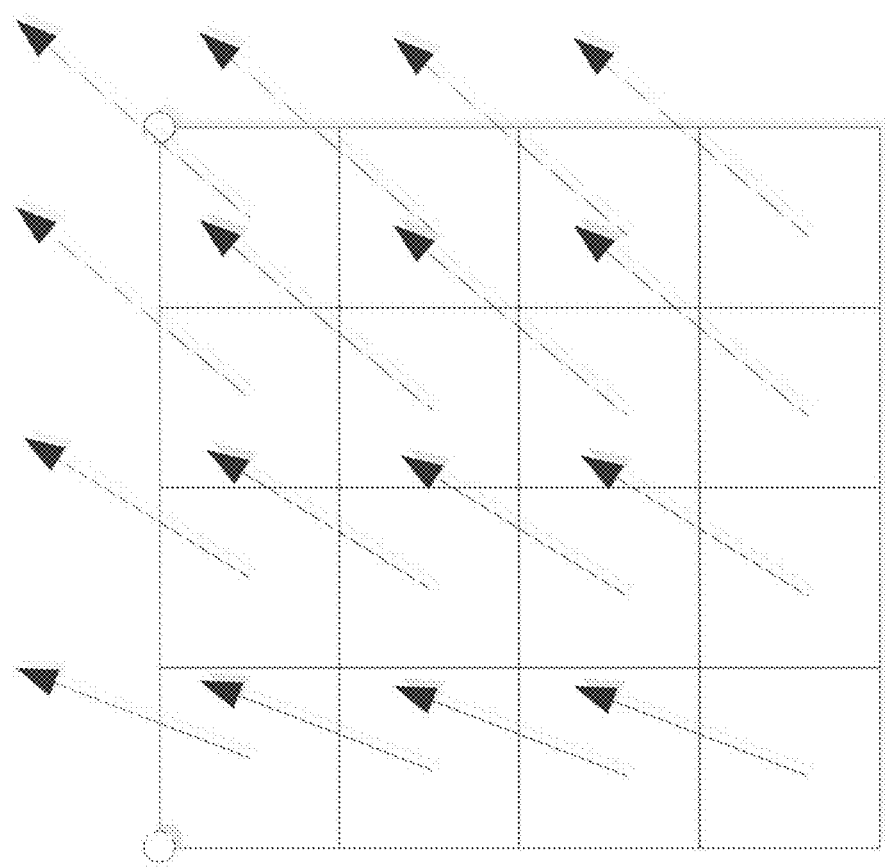
FIG. 1 shows an example of sub-block based prediction calculation.

Sub-block based prediction is first introduced into the video coding standard by HEVC Annex I (3D-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 shows the concept of sub-block based prediction.

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

2.1 Affine Prediction

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIG. 2, the affine motion field of the block is described by two (in the 4-parameter affine model) or three (in the 6-parameter affine model) control point motion vectors.

Figure 2A:
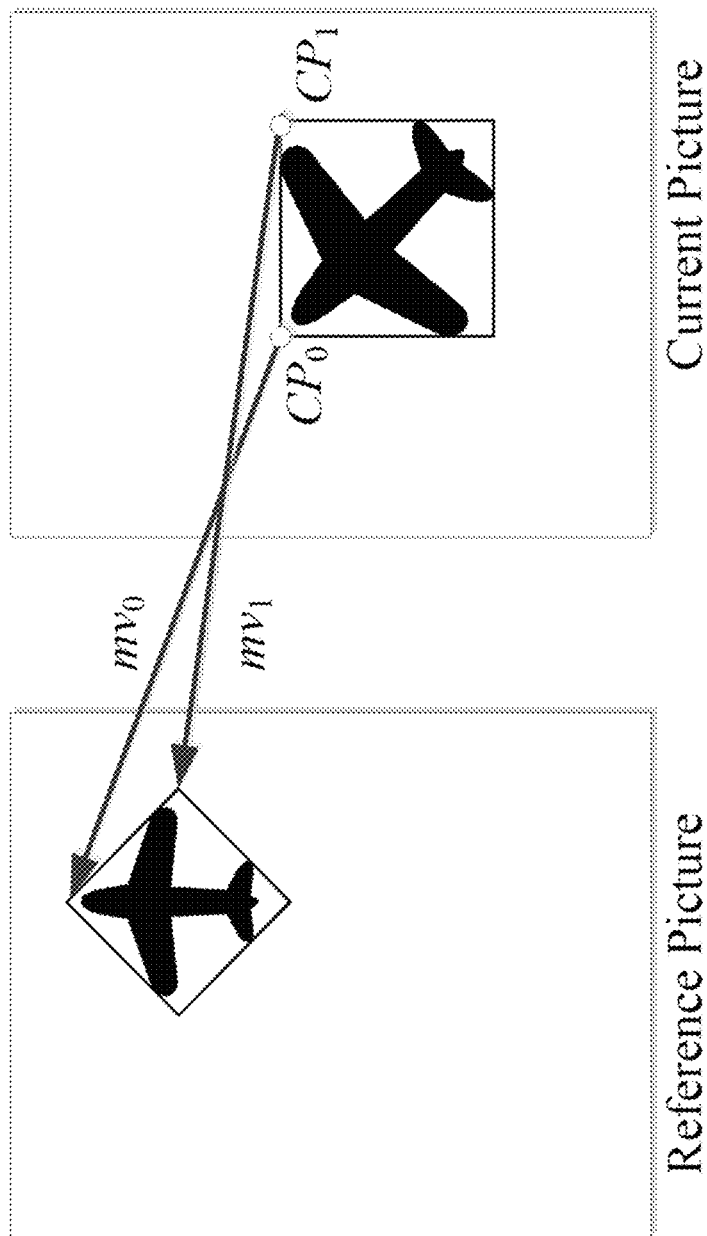
FIG. 2A-2B shows examples of Simplified affine motion model. (a) 4-parameter affine model; (b) 6-parameter affine model.
Figure 2B:
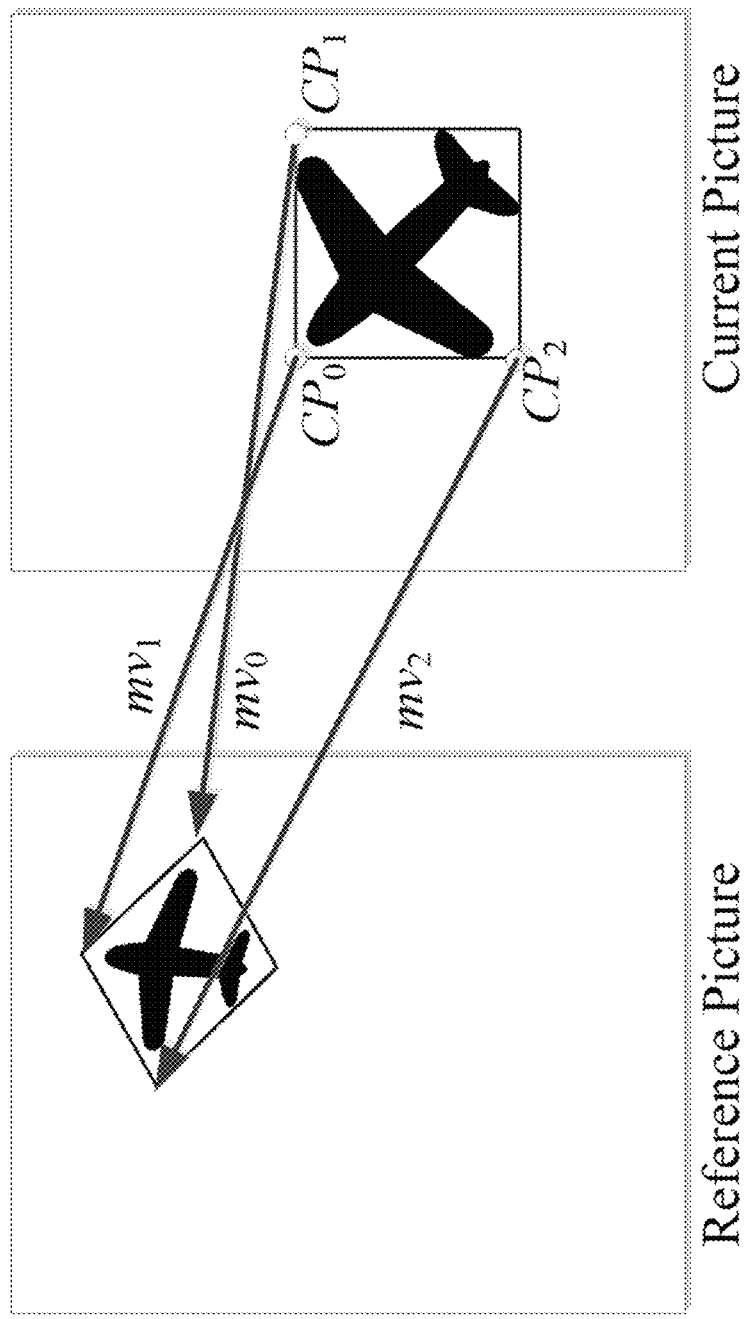

FIGS. 2A and 2B shows a simplified affine motion model. In particular, FIG. 2A shows an example of a 4-parameter affine model; and FIG. 2B shows an example of a 6-parameter affine model.

The motion vector field (MVF) of a block is described by the following equation with the 4-parameter affine model $$\begin{cases} mv^h(x, y) = \dfrac{(mv_1^h - mv_0^h)}{w}x - \dfrac{(mv_1^v - mv_0^v)}{w}y + mv_0^h \\ mv^v(x, y) = \dfrac{(mv_1^v - mv_0^v)}{w}x + \dfrac{(mv_1^h - mv_0^h)}{w}y + mv_0^v \end{cases} \quad (1)$$

and 6-parameter affine model:

$$\begin{cases} mv^h(x, y) = \dfrac{(mv_1^h - mv_0^h)}{w}x + \dfrac{(mv_2^h - mv_0^h)}{h}y + mv_0^h \\ mv^v(x, y) = \dfrac{(mv_1^v - mv_0^v)}{w}x + \dfrac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VVC Test model (VTM), the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, (1) and (2) are implemented as $$\begin{cases} iDMvHorX = (mv^h_1 - mv^h_0) \ll (S - \log 2(w)) \\ iDMvHorY = (mv^v_1 - mv^v_0) \ll (S - \log 2(w)) \end{cases} \quad (3)$$

For the 4-parameter affine model shown in (1):

$$\begin{cases} iDMvVerX = -iDMvHorY \\ iDMvVerY = iDMvHorX \end{cases} \quad (4)$$

For the 6-parameter affine model shown in (2):

$$\begin{cases} iDMvVerX = (mv^h_2 - mv^h_0) \ll (S - \log 2(h)) \\ iDMvVerY = (mv^v_2 - mv^v_0) \ll (S - \log 2(h)) \end{cases} \quad (5)$$

Finally, $$\begin{cases} mv^h(x, y) = \text{Normalize}(iDMvHorX \bullet x + iDMvVerX \bullet y + (mv^h_0 \ll S), S) \\ mv^v(x, y) = \text{Normalize}(iDMvHorY \bullet x + iDMvVerY \bullet y + (mv^v_0 \ll S), S) \end{cases} \quad (6)$$

$$\text{Normalize}(Z, S) = \begin{cases} (Z + \text{Off}) \gg S & \text{if } Z \leq 0 \\ -((-Z + \text{Off}) \gg S) & \text{Otherwise} \end{cases} \quad (7)$$

where S represents the calculation precision. e.g. in VVC, S=7. In VVC, the MV used in MC for a sub-block with the top-left sample at (xs, ys) is calculated by (6) with x=xs+2 and y=ys+2.

Figure 3:
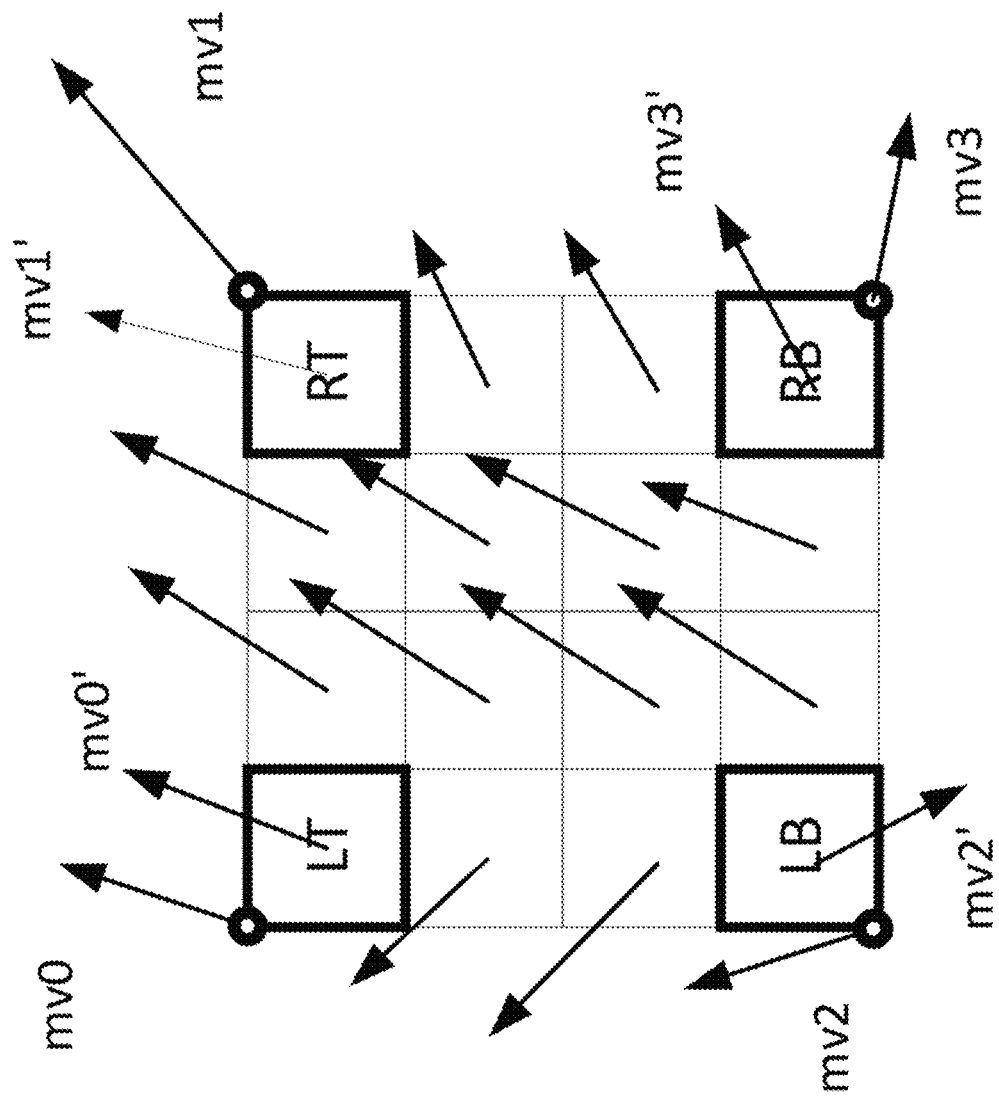
FIG. 3 shows an example of affine motion vector field (MVF) per subblock.

To derive motion vector of each 4×4 sub-block, the motion vector of the center sample of each sub-block, as shown in FIG. 3, is calculated according to Eq. (1) or (2), and rounded to 1/16 fraction accuracy. Then the motion compensation interpolation filters are applied to generate the prediction of each sub-block with derived motion vector.

FIG. 3 shows an example of affine MVF per sub-block.

Figure 4A:
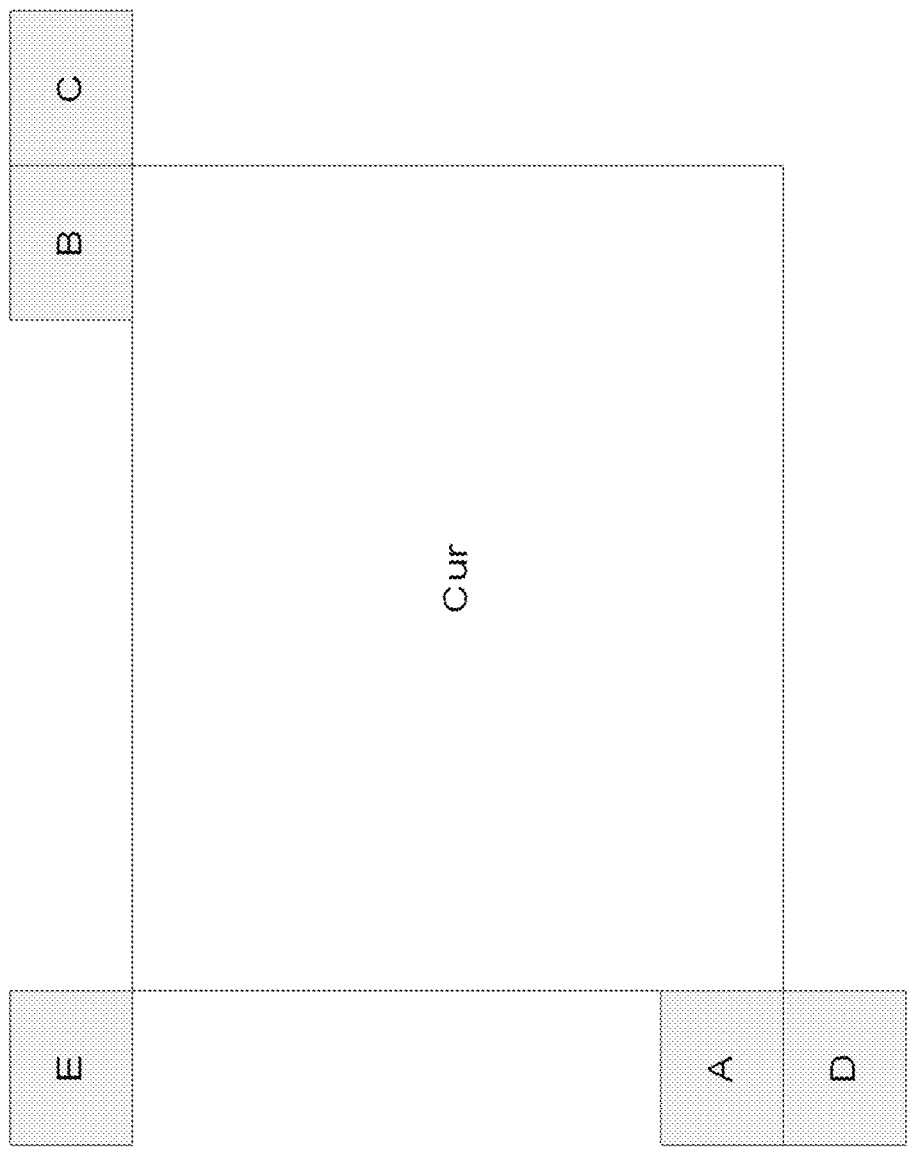
FIGS. 4A-4B show candidates for AF_MERGE mode.
Figure 4B:
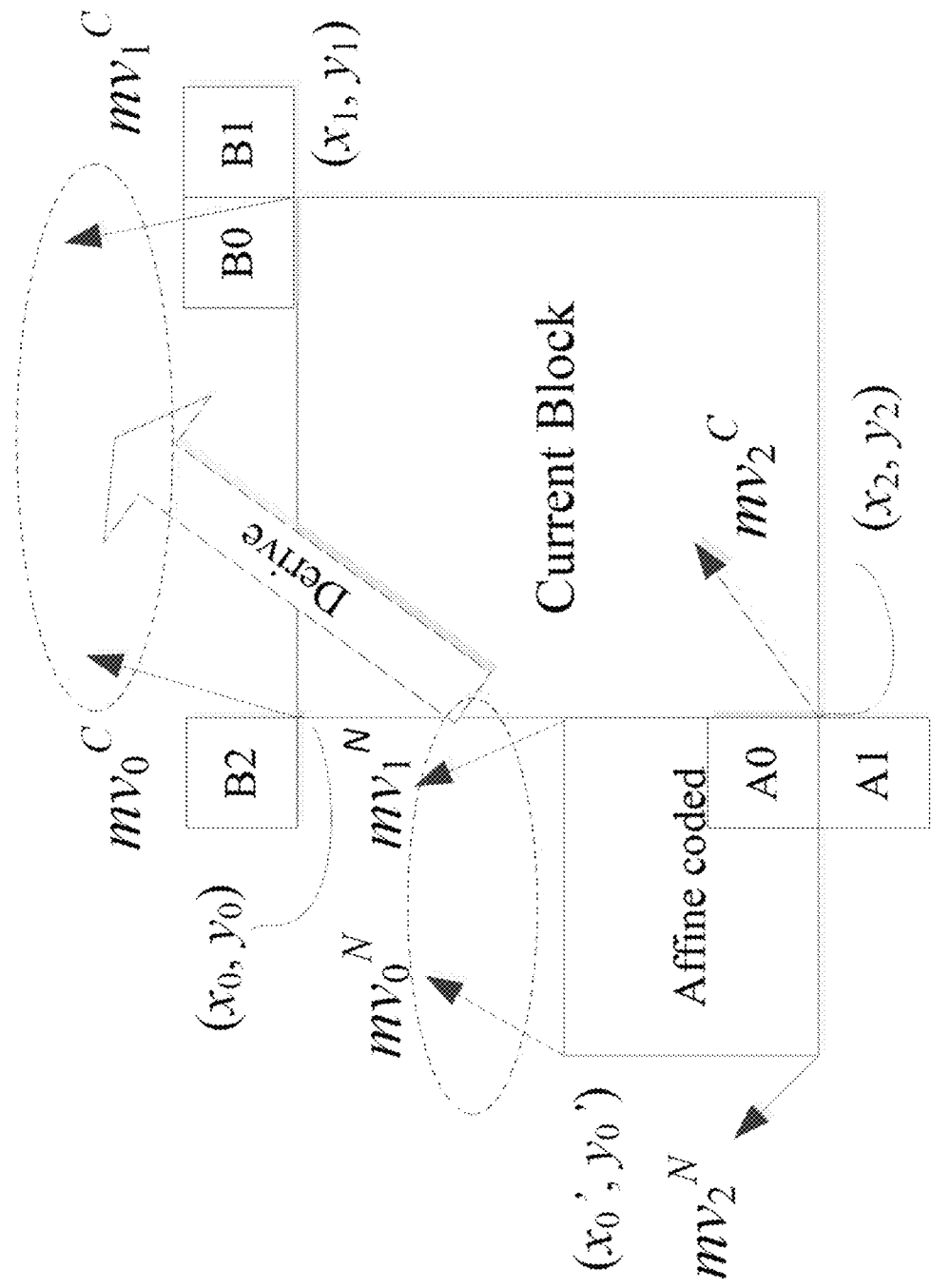

Affine model can be inherited from spatial neighbouring affine-coded block such as left, above, above right, left bottom and above left neighbouring block as shown in FIG. 4A. For example, if the neighbour left bottom block A is coded in affine mode as shown in FIG. 4B, the Control Point (CP) motion vectors $mv_0^N$, $mv_1^N$ and $mv_2^N$ of the top left corner, above right corner and left bottom corner of the neighbouring CU which contains the block A are fetched. And the motion vector $mv_0^C$, $mv_1^C$ and $mv_2^C$ (which is only used for the 6-parameter affine model) of the top left corner/top right/bottom left on the current CU is calculated based on $mv_0^N$, $mv_1^N$ and $mv_2^N$.

The inherited CP MVs $mv_0^C$, $mv_1^C$ and $mv_2^C$ can be used as CP MVs in the affine merge mode. Or they can be used as MVP for affine inter mode in VVC.

In the current design of affine in VVC, the motion vector stored in a sub-block and the motion vector used to do motion compensation may be different. Take FIG. 3 as an example. With the 4-parameter model, mv0 and mv1 which are at sub-block corner are stored for the two sub-blocks LT and RT, respectively, but mv0' and mv1' which are at the sub-block center are used to do MC for LT and RT, respectively. Besides, mv2 which is at sub-block corner is stored in sub-block LB, but mv2' is used to do MC for LB. Additionally, for the 6-parameter model, mv3 which is at sub-block corner is stored in sub-block LR, but mv3' is used to do MC for LR. Such design was intended for more accurate motion vector prediction for neighboring blocks which uses affine mode.

FIGS. 4A and 4B show examples of candidates for AF_MERGE.

In the current VVC, affine model can only be utilized by an affine coded block, not a non-affine coded block.

3. Example Techniques

Several methods are proposed to allow the affine model to be used by a non-affine coded block.

The detailed examples and techniques below should be considered as examples to explain general concepts. These inventions should not be interpreted in a narrow way. Furthermore, these inventions can be combined in any manner. Combination between this invention and other invention is also applicable.

Technique 1: Related to Non-Affine Blocks Predicted from Affine Motion

Figure 5:
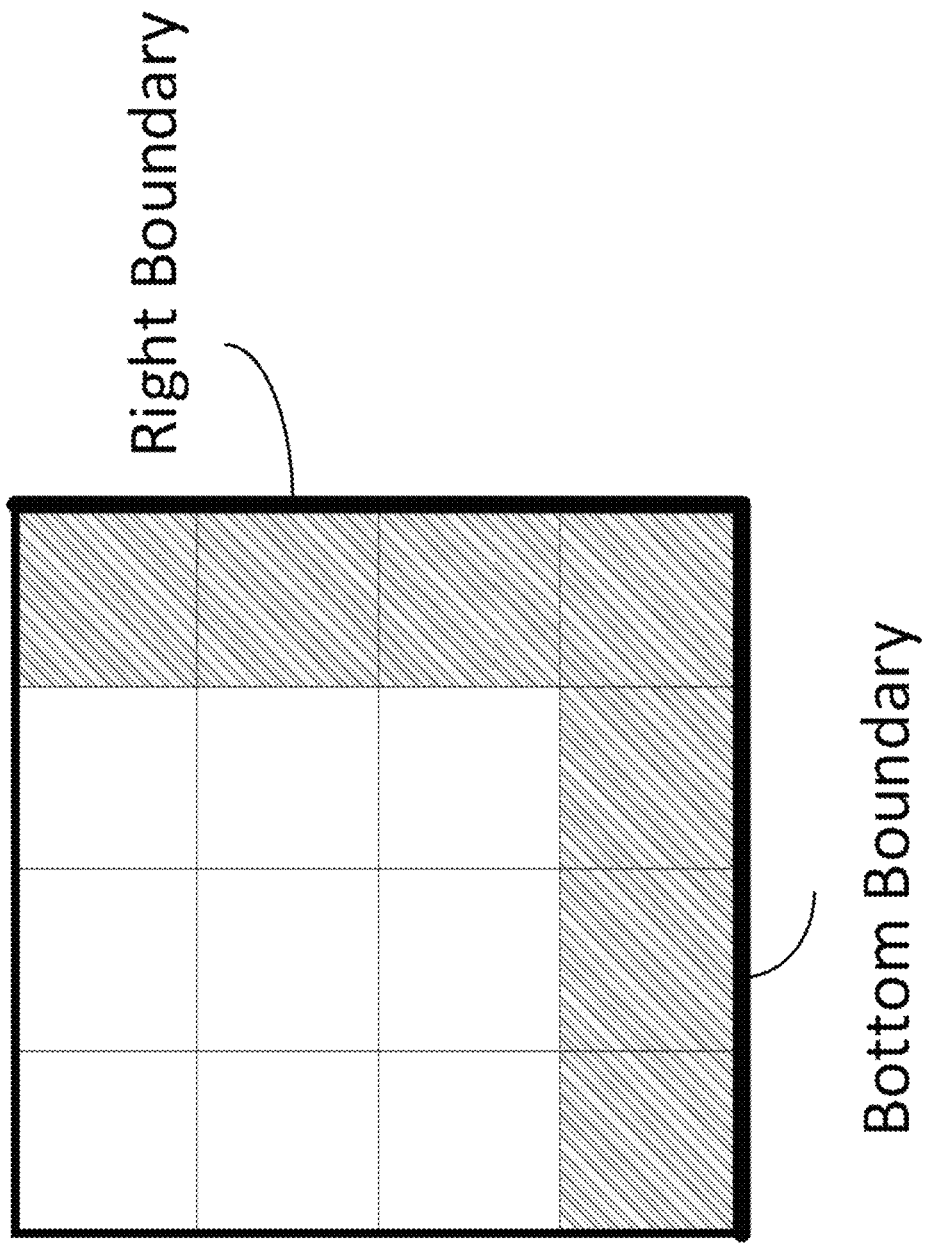
FIG. 5 shows an example of a block with subblocks at the right boundary and the bottom boundary highlighted.

1. It is proposed to update the motion information of affine coded blocks after motion compensation, and the updated motion information is stored and used for motion prediction for subsequent coded/decoded blocks.
   a. In one example, the updated motion information is used for motion prediction for subsequent coded/decoded blocks in different pictures.
   b. In one example, the filtering process (e.g., deblocking filter) is dependent on the updated motion information.
   c. The updating process may be invoked under further conditions, e.g., only for the right and/or bottom affine sub-blocks of one CTU. In this case, the filtering process may depend on the un-updated motion information and the update motion information may be used for subsequent coded/decoded blocks in current slice/tile or other pictures.
2. In one example, the MV stored in a sub-block located at the right boundary and/or the bottom boundary may be different to the MV used in MC for the sub-block. FIG. shows an example, where sub-blocks located at the right boundary and the bottom boundary are shaded.
   a. In one example, the stored MV in a sub-block located at the right boundary and/or the bottom boundary can be used as MV prediction or candidate for the subsequent coded/decoded blocks in current or different frames.

b. In one example, the stored MV in a sub-block located at the right boundary and/or the bottom boundary may be derived with the affine model with a representative point outside the sub-block.
c. In one example, two sets of MV are stored for the right boundary and/or bottom boundary, one set of MV is used for deblocking, temporal motion prediction and the other set is used for motion prediction of following PU/CUs in the current picture. FIG. 5 shows examples of sub-blocks at right and bottom boundary are shaded.

Figure 6A:
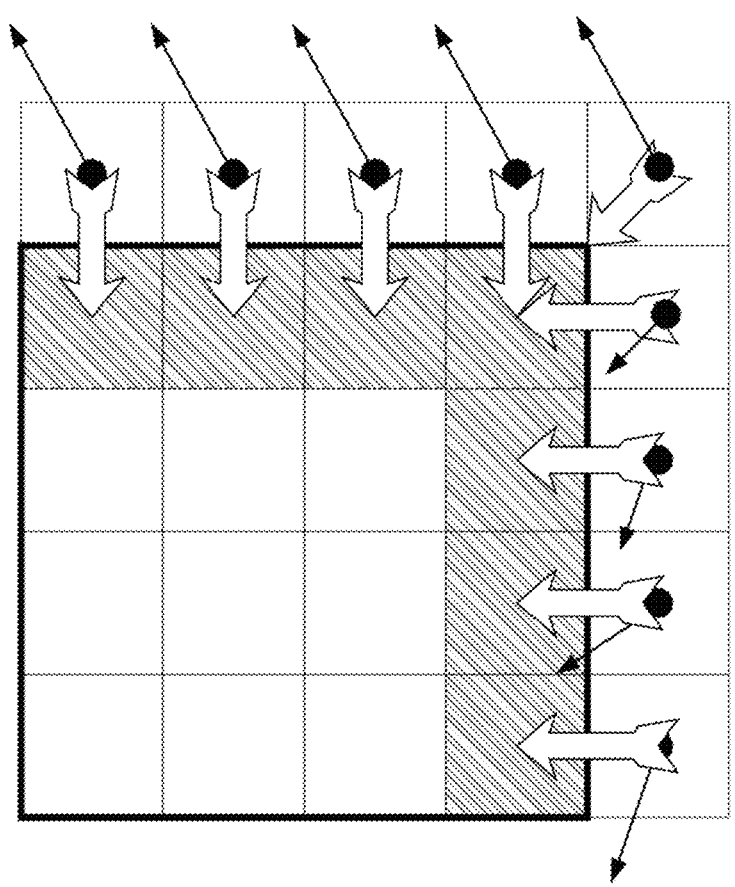
FIG. 6A-6D show examples of positions used to derive MV stored in sub-blocks at the right and bottom boundaries.
Figure 6B:
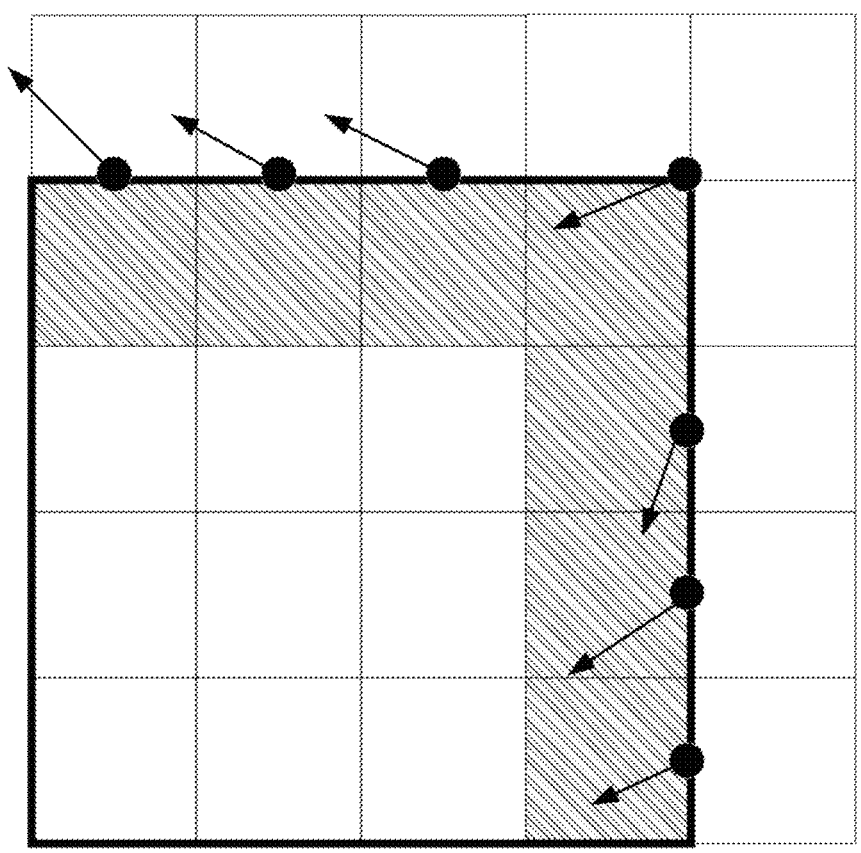
Figure 6C:
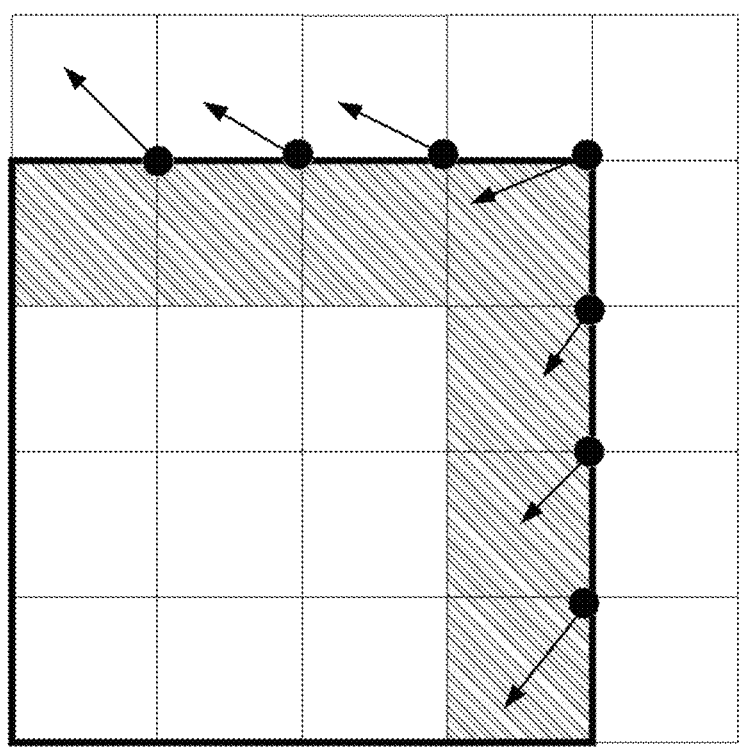
Figure 6D:
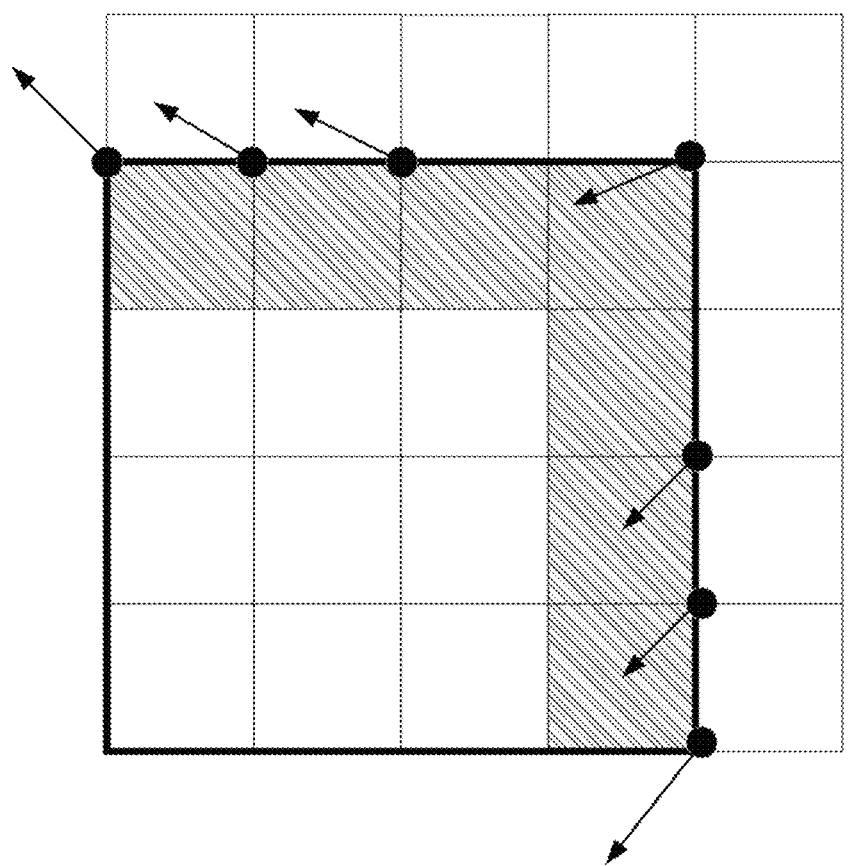

3. Suppose the coordinate of the top-left corner of the current block is (x0, y0), the coordinate of the top-left corner of a sub-block is (x', y'), the size of a sub-block is M×N, and the MV stored in a sub-block is denoted as (MVx, MVy). (MVx, MVy) is calculated with Eq(1) with the 4-parameter affine model or Eq(2) with the 6-parameter affine model with the representative point (x, y) set to (xp-x0, yp-y0) and (xp, yp) may be defined as follows:
   a. xp=x'+M+M/2, yp=y'+N/2 if the sub-block is at the right boundary; such an example is depicted in FIG. 6A.
   b. xp=x'+M/2, yp=y'+N+N/2 if the sub-block is at the bottom boundary, such an example is depicted in FIG. 6A;
   c. For the bottom-right corner, the representative point (x, y) may be defined as:
      i. In one example, xp=x'+M+M/2, yp=y'+N/2 if the sub-block is at the bottom-right corner;
      ii. In one example, xp=x'+M/2, yp=y'+N+N/2 if the sub-block is at the bottom-right corner;
      iii. In one example, xp=x'+M+M/2, yp=y'+N+N/2 if the sub-block is at the bottom-right corner;
   d. xp=x'+M, yp=y'+N/2 if the sub-block is at the right boundary; such an example is depicted in FIG. 6B;
   e. xp=x'+M/2, yp=y'+N if the sub-block is at the bottom boundary; such an example is depicted in FIG. 6B;
   f. xp=x'+M, yp=y'+N if the sub-block is at the bottom right corner. such an example is depicted in FIG. 6B;
   g. xp=x'+M, yp=y'+N if the sub-block is at the right boundary or the bottom boundary. such an example is depicted in FIG. 6C;
   h. xp=x', yp=y'+N if the sub-block is at the bottom boundary. such an example is depicted in FIG. 6D;
   i. xp=x'+M, yp=y' if the sub-block is at the right boundary; such an example is depicted in FIG. 6D;
   j. xp=x'+M, yp=y'+N if the sub-block is at the bottom right corner. such an example is depicted in FIG. 6D.
   FIG. 6A to 6D Possible positions to derive the MV stored in sub-blocks at right boundary and bottom boundary.

4. In one example, some sub-blocks at the bottom boundary or right boundary are exceptional when deriving its stored MV.
   a. For the top-right corner (block RT as shown in FIG. 3), it always stores the MV at the top-right corner (mv1 as shown in FIG. 3).
   b. For the bottom-left corner (block LB as shown in FIG. 3), it always stores the MV at the bottom-left corner (mv2 as shown in FIG. 3).
      i. Alternatively, for the bottom-left corner, it stores the MV only when mv2 is a signaled MV.
   c. For the bottom-right corner (block RB as shown in FIG. 3), it always stores the MV at the bottom-right corner (mv3 as shown in FIG. 3).

Figure 7:
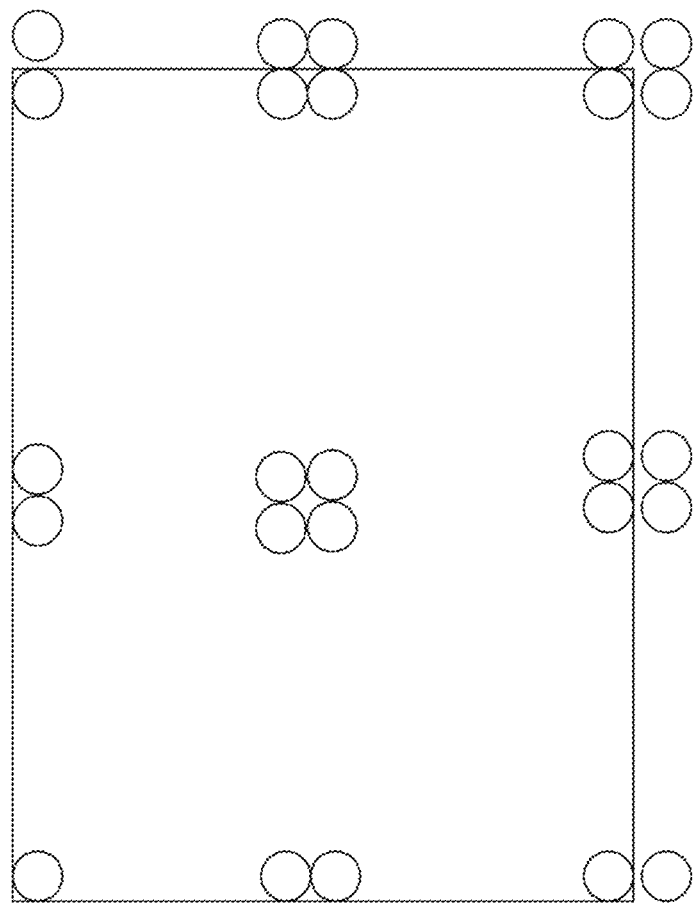
FIG. 7 shows pixel positions used for deriving MV prediction.

5. In one example, a MV prediction (may include one MV or two MVs for both inter-prediction directions) can be derived for the current non-affine coded block from a neighbouring affine coded block based on the affine model.
   a. For example, the MV prediction can be used as a MVP candidate in the MVP candidate list when the current block is coded with inter-mode.
   b. For example, the MV prediction can be used as a merge candidate in the MVP candidate list when the current block is coded with merge mode.
   c. Suppose the coordinate of the top-left corner of the neighbouring affine-coded block is (x0, y0), the CP MVs of the neighbouring affine coded block are $mv_0=(mv_0^h, mv_0^v)$ for the top-left corner, $mv_1=(mv_1^h, mv_1^v)$ for the top-right corner and $mv_2=(mv_2^h, mv_2^v)$ for the bottom-right corner. The width and height of the neighbouring affine coded block are w and h. The coordinate of the top-left corner of the current block is (x', y') and the coordinate of an arbitrary point in the current block is (x", y"). The width and height of the current block is M and N.
      i. In one example, the MV prediction is calculated as $(mv^h(x, y), mv^v(x, y))$ from Eq (1) with x=x"−x0, y=y"−y0 if the neighbouring affine coded block utilizes the 4-parameter affine model;
      ii. In one example, the MV prediction is calculated as $(mv^h(x, y), mv^v(x, y))$ from Eq (2) with x=x"−x0, y=y"−y0 if the neighbouring affine coded block utilizes the 6-parameter affine model;
      iii. Some possible position of (x", y") are: (shown in FIG. 7)
   1. (x', y')
   2. (x'+M/2, y')
   3. (x'+M/2+1, y')
   4. (x'+M−1, y')
   5. (x'+M, y')
   6. (x', y'+N/2)
   7. (x'+M/2, y'+N/2)
   8. (x'+M/2+1, y'+N/2)
   9. (x'+M−1, y'+N/2)
   10. (x'+M, y'+N/2)
   11. (x', y'+N/2+1)
   12. (x'+M/2, y'+N/2+1)
   13. (x'+M/2+1, y'+N/2+1)
   14. (x'+M−1, y'+N/2+1)
   15. (x'+M, y'+N/2+1)
   16. (x', y'+N−1)
   17. (x'+M/2, y'+N−1)
   18. (x'+M/2+1, y'+N−1)
   19. (x'+M−1, y'+N−1)
   20. (x'+M, y'+N−1)
   21. (x', y'+N)
   22. (x'+M/2, y'+N)
   23. (x'+M/2+1, y'+N)
   24. (x'+M−1, y'+N)
   25. (x'+M, y'+N)

6. If a neighbouring basic-unit block S (e.g., it is a 4×4 block in VVC) belongs to an affine coded block T (For example, the basic-unit block A0 in FIG. 4(*b*) belongs to an affine coded block), the following ways may be applied to get motion prediction candidates:
   a. In one example, when basic-unit block S is accessed by the MVP list construction procedure and/or the merge candidate list construction procedure, the MV stored in S is not fetched. Instead, the derived MV prediction from the affine coded block T for the current block is fetched.
  b. In one example, the basic-unit block S is accessed twice by the MVP list construction procedure and/or the merge candidate list construction procedure. In one access, the MV stored in S is fetched. In another access, the derived MV prediction from the affine coded block T for the current block is fetched as an extra MVP candidate or merge candidate.
7. If a neighbouring basic-unit block S (e.g., it is a 4×4 block in VVC) belongs to an affine coded block T, the extra MVP candidate or merge candidate which is derived from the affine coded block T for the current block can be added to the MVP candidate list or merge candidate list at the position:
  a. In one example, after the candidate fetched from block S;
  b. In one example, before the candidate fetched from block S;
  c. In one example, after all normal spatial candidates but before the temporal candidates;
  d. In one example, after the temporal candidates;
  e. In one example, the position could be adaptively changed from block to block.
8. In one example, the total number of extra candidates derived from the affine coded block cannot exceed a fixed number such as 1 or 2.
  a. Alternatively, the fixed number may be further dependent on coded information, e.g., size of candidate list, total number of available motion candidates before adding these extra candidates, block size, block type, coded mode (AMVP or merge), slice type, etc. al.
9. In one example, the extra candidates derived from the affine coded block may be pruned with other candidates. A derived candidate is not added into the list if it is identical to another candidate already in the list.
  a. In one example, if a neighbouring basic-unit block S (it is a 4×4 block in VVC) belongs to an affine coded block T, the extra candidate derived from the affine coded block T is compared with the MV fetched from S.
  b. In one example, derived candidates are compared with other derived candidates.
10. In one example, whether to and how to apply the MV prediction derived for the current non-affine coded block from a neighbouring affine coded block may depend on the dimensions of the current block (Suppose the current block size is W×H).
  a. For example, it is not applied if W>=T and H>=T, where T is an integer such as 8;
  b. For example, it is not applied if W>=T or H>=T, where T is an integer such as 8;
  c. For example, it is not applied if W<=T and H<=T, where T is an integer such as 8;
  d. For example, it is not applied if W<=T or H<=T, where T is an integer such as 8;

Technique 2: General Applications Related to Affine Motion

11. Selection of the presentative point may be shifted instead of always being equal to (M/2, N/2) relative to top-left sample of one sub-block with size equal to M×N.
  a. In one example, the presentative point may be set to ((M>>1)-0.5, (N>>1)-0.5).
  b. In one example, the presentative point may be set to ((M>>1)-0.5, (N>>1)).
  c. In one example, the presentative point may be set to ((M>>1), (N>>1)-0.5).
  d. In one example, the presentative point may be set to ((M>>1)+0.5, (N>>1)).
  e. In one example, the presentative point may be set to ((M>>1), (N>>1)+0.5).
  f. In one example, the presentative point may be set to ((M>>1)+0.5, (N>>1)+0.5).
  g. In one example, when the coordinate of the left-top corner of a sub-block relative to the top-left sample of the current block is (xs, ys), the coordinate of the representative point is defined to be (xs+1.5, ys+1.5).
    i. In one embodiment, Eq (6) is rewritten to derive the MVs for the new representative point as:

$$\begin{cases} mv^h(x, y) = \text{Normalize}(iDMvHorX \cdot (2xs + 3) + \\ iDMvVerX \cdot (2ys + 3) + (mv_0^h << (S + 1)), S + 1) \\ mv^v(x, y) = \text{Normalize}(iDMvHorY \cdot (2xs + 3) + \\ iDMvVerY \cdot (2ys + 3) + (mv_0^v << (S + 1)), S + 1) \end{cases}$$

ii. Similarly, an additional offset (0.5, 0.5) or (−0.5, −0.5) or (0, 0.5), or (0.5, 0), or (−0.5, 0), or (0, −0.5) may be added to those representative points.
12. It is proposed to align the stored motion information with that used in motion compensation.
  a. In one example, the currently stored mvi in FIG. 3 is replaced by mvi' wherein i being (0, and/or 1, and/or 2, and/or 3).
13. It is proposed that a motion candidate (e.g., a MVP candidate for AMVP mode, or a merge candidate) fetched from an affine coded block should be used in a different way from that fetched from a non-affine coded block.
  a. For example, a motion candidate fetched from affine coded block may not be put into the motion candidate list or the merge candidate list;
  b. For example, a motion candidate fetched from affine coded block may be put into the motion candidate list or the merge candidate list with a lower priority, e.g. it should be put at a more posterior position.
  c. The order of merging candidates may be adaptively changed based on whether the motion candidate is fetched from an affine coded block.
14. The affine MVP candidate list size or affine merge candidate list size for an affine coded block may be adaptive.
  a. In one example, the affine MVP candidate list size or affine merge candidate list size for an affine coded block may be adaptive based on the size of the current block.
    i. For example, the affine MVP candidate list size or affine merge candidate list size for an affine coded block may be larger if the block is larger.
  b. In one example, the affine MVP candidate list size or affine merge candidate list size for an affine coded block may be adaptive based on the coding modes of the spatial or temporal neighbouring blocks.
    i. For example, the affine MVP candidate list size or affine merge candidate list size for an affine coded block may be larger if there are more spatial neighbouring blocks are affine-coded.

Figure 8:
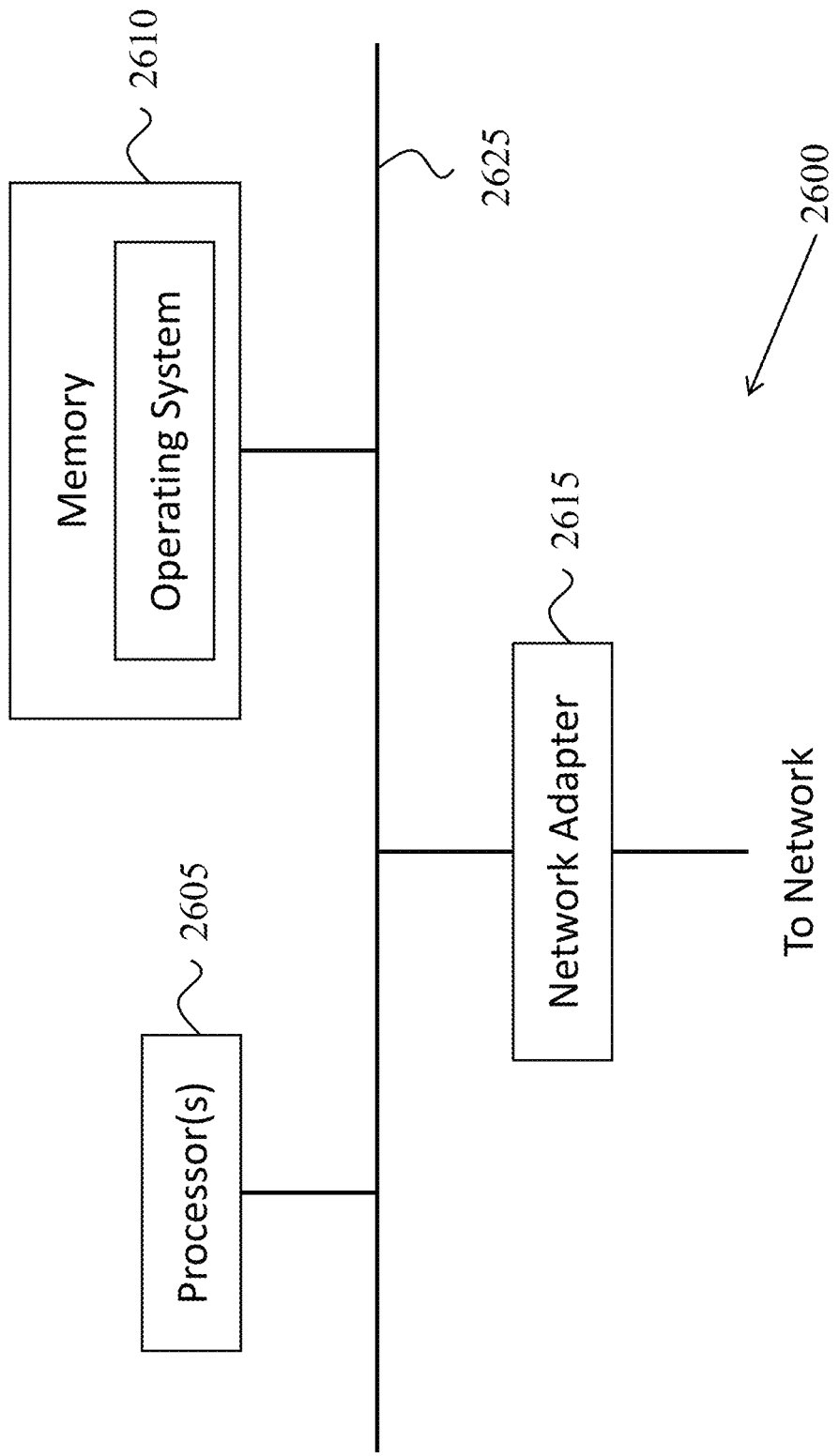
FIG. 8 is a block diagram illustrating an example of the architecture for a computer system or other control device that can be utilized to implement various portions of the presently disclosed technology.
Figure 9:
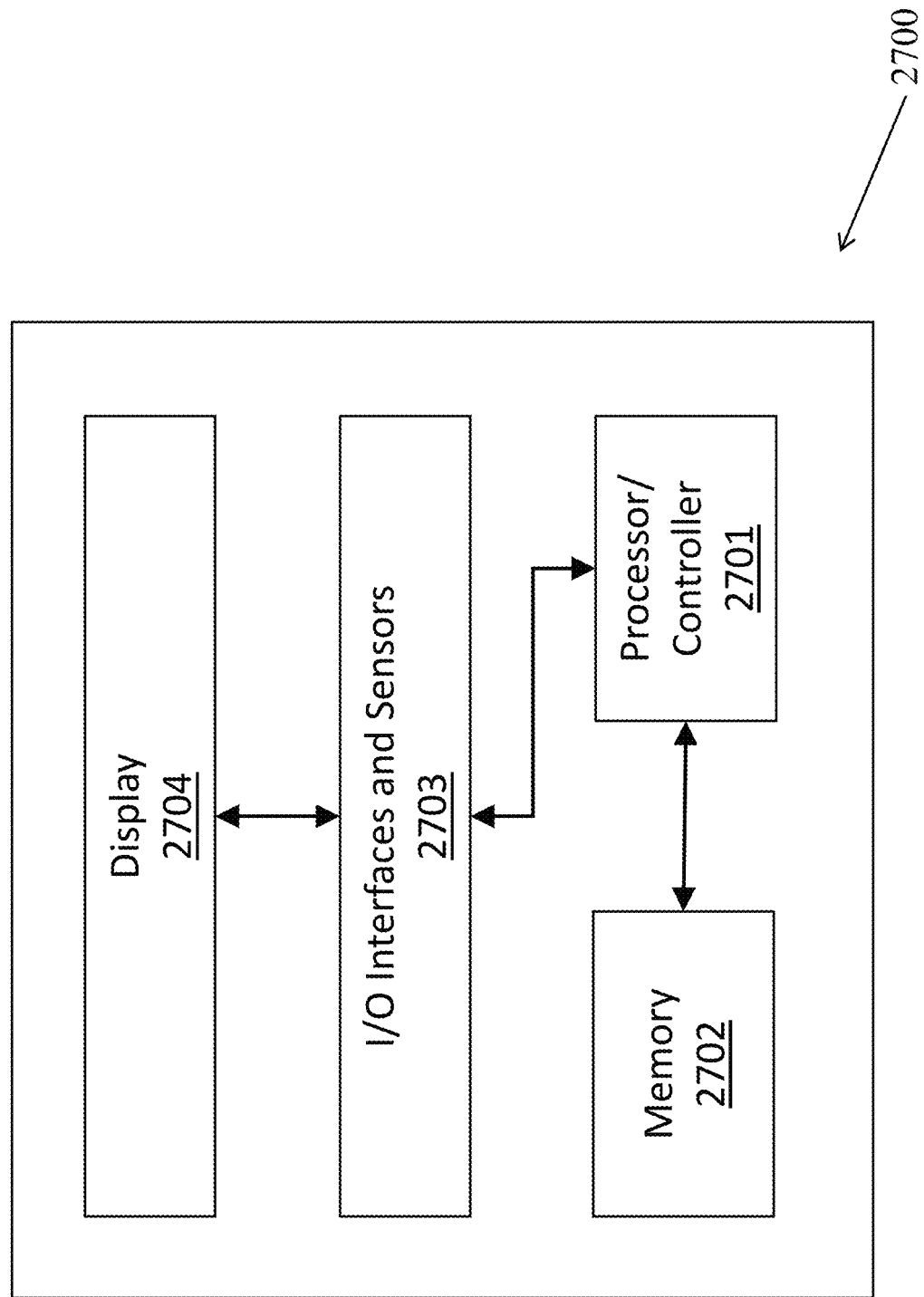
FIG. 9 shows a block diagram of an example embodiment of a mobile device that can be utilized to implement various portions of the presently disclosed technology.

FIG. 8 is a block diagram illustrating an example of the architecture for a computer system or other control device 2600 that can be utilized to implement various portions of the presently disclosed technology. In FIG. 8, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2$^C$) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 10:
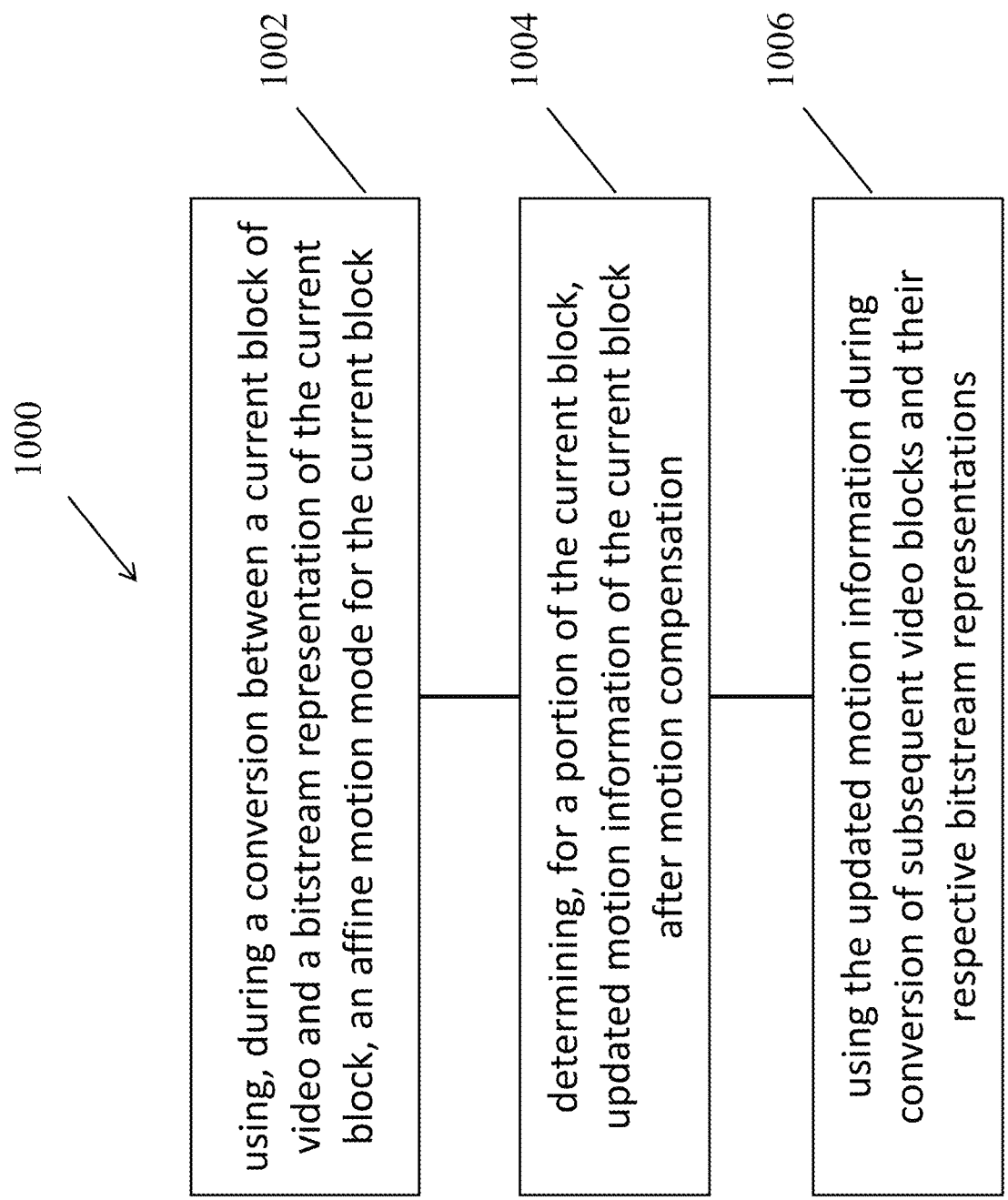
FIG. 10 is a flowchart for an example method of visual media processing.

FIG. 10 shows a block diagram of an example embodiment of a mobile device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

FIG. 10 is an example flowchart for a method 1000 of video processing. The method 1000 includes using (1002), during a conversion between a current block of video and a bitstream representation of the current block, an affine motion mode for the current block, determining (1004), for a portion of the current block, updated motion information of the current block after motion compensation, and using (1006) the updated motion information during conversion of subsequent video blocks and their respective bitstream representations.

The conversion operation may include, by a video encoder, generating the bitstream representation from the current video block. The conversion operation may include, by a video decoder, generating the current video block from the bitstream representation.

The below-described clauses further describe certain features of the disclosed embodiments.

1. A method of video coding, comprising: using, during a conversion between a current block of video and a bitstream representation of the current block, an affine motion mode for the current block; determining, for a portion of the current block, updated motion information of the current block after motion compensation; and using the updated motion information during conversion of subsequent video blocks and their respective bitstream representations.

2. The method of clause 1, wherein the subsequent video blocks are in a different picture from a picture of the current block.

3. The method of clause 1 or 2, further including: performing a block filtering operation using the updated motion information.

4. The method of clause 3, wherein the block filtering operation includes a deblocking filtering operation.

5. The method of clause 1, wherein the portion of the current block includes only right or bottom affine sub-blocks of one coding tree unit.

6. The method of clause 1, wherein the updated motion vector information for a sub-block located at a right boundary or a bottom boundary of the current block is different from a motion vector used for motion compensation of the sub-block.

7. The method of clause 6, wherein the updated motion vector information for the sub-block is used during conversion of subsequent video blocks and their respective bitstream representations, wherein the subsequent video blocks are either in a same picture as the sub-block or a different picture as the sub-block.

8. The method of clause 6, wherein the updated motion information includes two sets of motion vectors for right or bottom boundary sub-blocks and wherein a first set of motion vectors is used for deblocking filtering or temporal motion prediction and a second set of motion vectors is used for motion prediction of a subsequent prediction unit or a subsequent coding unit in a current picture as the current block.

9. The method of clause 1, wherein a coordinate of a top-left corner of the current block is (x0, y0), a coordinate of a top-left corner of a sub-block is (x', y'), a size of a sub-block is M×N pixels, and a motion vector stored for the sub-block is denoted as (MVx, MVy), and wherein (MVx, MVy) is calculated with a 4-parameter affine model or a 6-parameter affine model.

10. The method of clause 1, wherein the portion of the current block excludes sub-block at a right boundary or a bottom boundary.

11. The method of clause 1, 3 to 10, wherein the subsequent video blocks are in a same picture as the current block.

12. A method of video processing, including deriving, during a conversion between a current block of video and a bitstream representation of the current block, motion vector prediction for a non-affine mode of the current block; wherein the non-affine mode is derived from a neighbouring affine coded block based on an affine mode; and performing the conversion using the non-affine mode of the current block.

13. The method of clause 12, wherein the current block is inter-mode coded, and wherein motion vector prediction for the non-affine mode is used as a motion vector prediction candidate.

14. The method of clause 12, wherein the current block is inter-mode coded, and wherein motion vector prediction for the non-affine mode is used as a merge candidate.

Additional examples of clauses 12 to 14 are given in Item 5 in Section 4.

15. A method of video processing, including: using, during a conversion between a current block of video and a bitstream representation of the current block, affine coding mode for the current block; wherein the affine mode uses an off-center presentative point from the current block.

16. The method of clause 15, wherein the current block comprises M×N pixels, where M and N are integers, and the representative point is set to ((M>>1)−0.5, (N>>1)−0.5).

17. The method of clause 15, wherein the current block comprises M×N pixels, where M and N are integers, and the representative point is ((M>>1)−0.5, (N>>1)).

Addition examples of clauses 15-17 are given in Section 4, Item 6-10 and 11.

18. The method of any of clauses 1 to 17, wherein stored motion information for affine mode is used for motion compensation of the current block.

19. A method of video processing, including using, during a conversion between a current block of video and a bitstream representation of the current block, a first motion candidate fetched from an affine coded block uses a different way from a second motion candidate fetched from a non-affine coded block; and performing the conversion using the first motion candidate or the second motion candidate.

20. The method of clause 19, wherein the first motion candidate is unused for motion candidate list or merge candidate list.

21. The method of clause 19, wherein the first motion candidate is used for motion candidate list or merge candidate list at a lower priority than other motion candidates.

Additional examples of clauses 19 to 21 are given in Section 4, Item 13.

22. A method of video processing, including: using, during a conversion between a current block of video and a bitstream representation of the current block, a motion vector prediction (MVP) candidate list and an affine merge candidate list; and performing the conversion using the MVP candidate list or the affine merge candidate list.

23. The method of clause 22, wherein a size of the affine merge candidate list is a function of a size of the current block.

24. The method of clause 22, wherein a size of the affine merge candidate list is a function of a coding mode of a spatial or a temporal neighbouring block.

25. The method of clause 24, wherein the size of the affine merge candidate list is increased with a number of spatial neighbouring blocks that are affine coded.

Additional examples of clauses 22 to 25 are given in Section 4, Item 14.

Various additional details are described in Section 4, Techniques 1 and 2.

Figure 11:
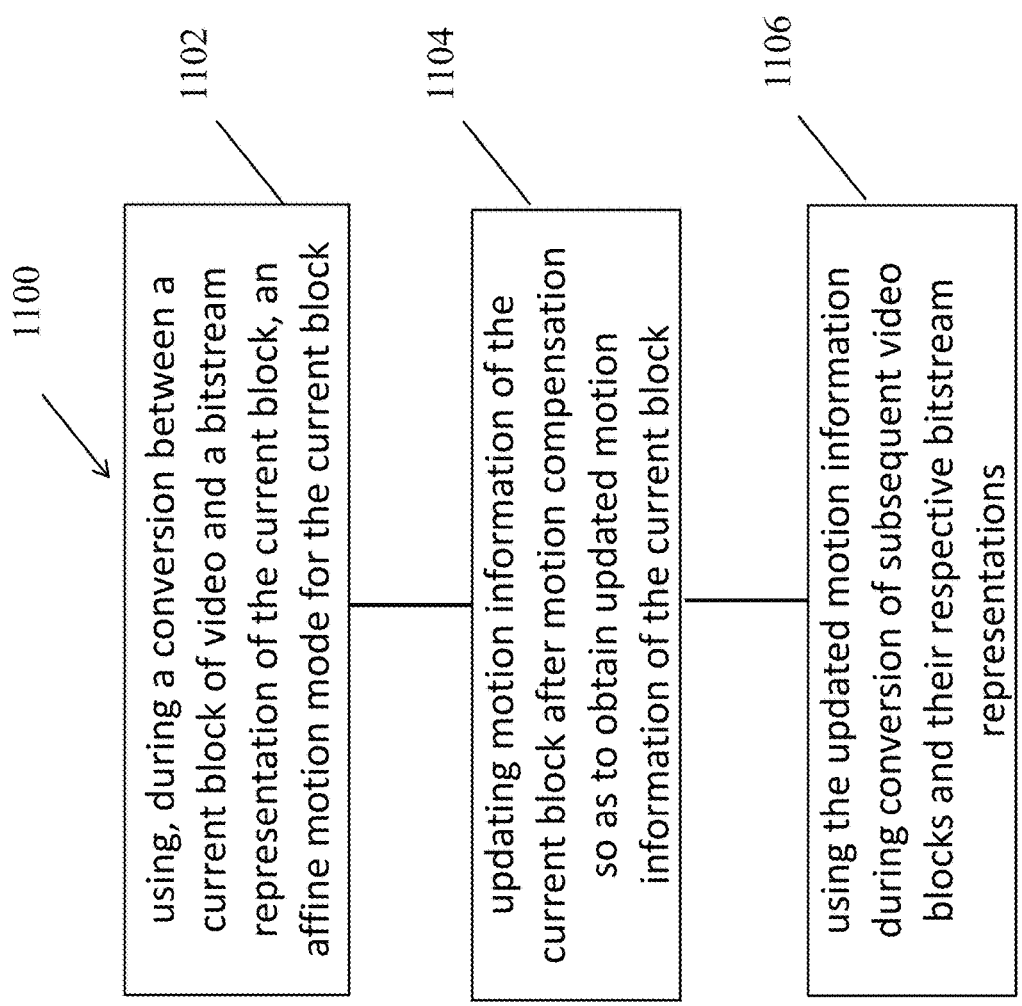
FIG. 11 is a flowchart for another example method of video processing.

FIG. 11 is a flowchart representation of a method 1100 of video coding. The method 1100 includes using (1102), during a conversion between a current block of video and a bitstream representation of the current block, an affine motion mode for the current block, updating (1104) motion information of the current block after motion compensation so as to obtain updated motion information of the current block, and using (1106) the updated motion information during conversion of subsequent video blocks and their respective bitstream representations.

In some embodiments, the subsequent video blocks are in a different picture from a picture of the current block.

In some embodiments, the method further including: performing a block filtering operation using the updated motion information.

In some embodiments, the block filtering operation includes a deblocking filtering operation.

In some embodiments, updating motion information of the current block includes updating motion information for a portion of the current block including only right or bottom affine sub-blocks of one coding unit.

In some embodiments, the method further including: performing a block filtering operation using un-updated motion information, and using the updated motion information during conversion of the subsequent video blocks in current slice/tile or other pictures and their respective bitstream representations.

In some embodiments, a motion vector stored in a sub-block located at a right boundary or a bottom boundary of the current block is different from a motion vector used in motion compensation for the sub-block.

In some embodiments, the motion vector stored in the sub-block located at the right boundary or the bottom boundary is used as motion vector prediction or candidate during the conversion of subsequent video blocks in current frame or different frame and their respective bitstream representations.

In some embodiments, the motion vector stored in the sub-block located at the right boundary or the bottom boundary includes two sets of motion vectors, a first set of motion vectors is used for deblocking filtering and/or temporal motion prediction and a second set of motion vectors is used for motion prediction of a subsequent prediction unit or a subsequent coding unit in a current picture as the current block.

In some embodiments, updating motion information of the current block excludes sub-blocks at a right boundary or a bottom boundary of the current block.

In some embodiments, for the sub-block at a top-right corner of the current block, motion vector at the top-right corner derived from the affine model is always stored.

In some embodiments, for the sub-block at a bottom-left corner of the current block, motion vector at the bottom-left corner derived from the affine model is always stored.

In some embodiments, for the sub-block at a bottom-left corner of the current block, motion vector at the bottom-left corner derived from the affine model is stored when the motion vector is a signaled motion vector.

In some embodiments, for the sub-block at a bottom-right corner of the current block, motion vector at the bottom-right corner derived from the affine model is always stored.

Figure 12:
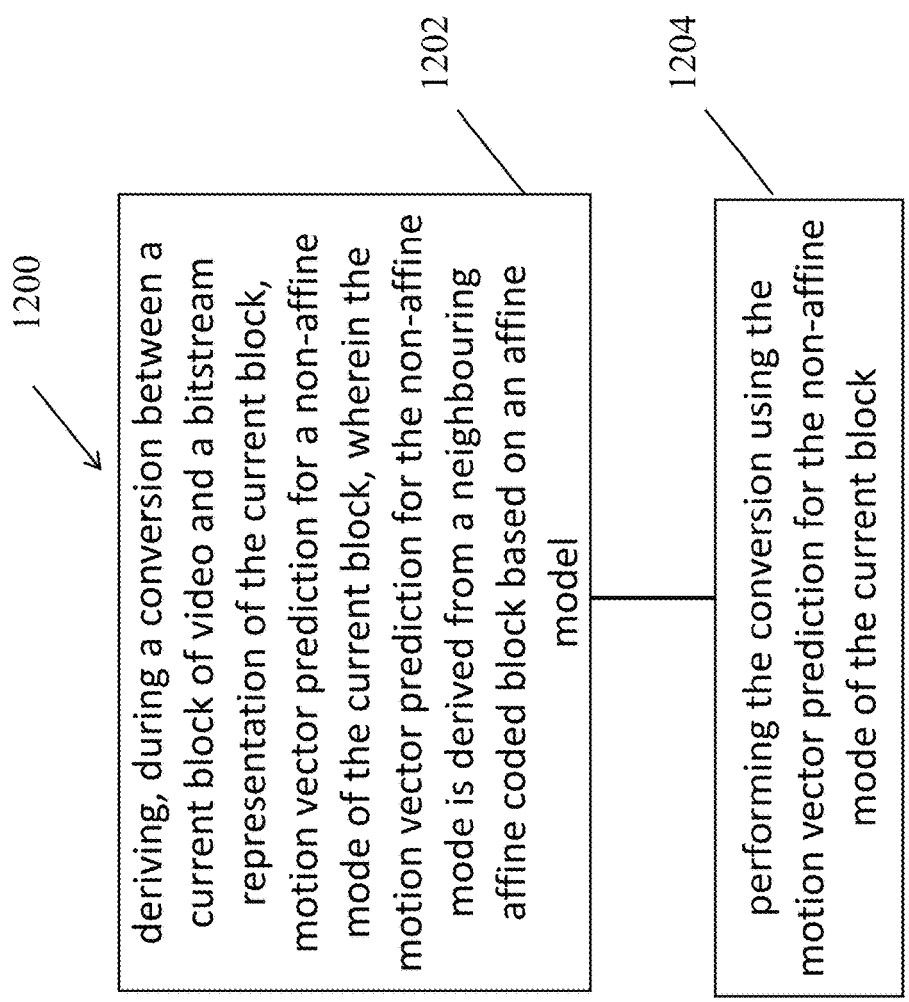
FIG. 12 is a flowchart for another example method of video processing.

FIG. 12 is a flowchart representation of a method 1200 of video coding. The method 1200 includes deriving (1202), during a conversion between a current block of video and a bitstream representation of the current block, motion vector prediction for a non-affine mode of the current block, wherein the non-affine mode is derived from a neighbouring affine coded block based on an affine model, and performing (1204) the conversion using the non-affine mode of the current block.

In some embodiments, the current block is coded with inter-mode, and wherein motion vector prediction for the non-affine mode is used as a motion vector prediction candidate in a motion vector prediction candidate list.

In some embodiments, the current block is coded with merge mode, and wherein motion vector prediction for the non-affine mode is used as a merge candidate in a motion vector prediction candidate list.

In some embodiments, the neighboring affine coded block uses an affine model with four parameters, and the motion vector prediction is derived by using the four parameters, or the neighboring affine coded block uses an affine model with six parameters, and the motion vector prediction is derived by using the six parameters.

In some embodiments, the motion vector prediction is derived based on an affine model targeting at a position inside the current block.

In some embodiments, the method further comprising: accessing a sub-unit block of the neighboring affine coded block by using motion vector prediction list construction procedure and/or merge candidate list construction procedure; fetching derived motion vector prediction from the neighboring affine coded block based on an affine model for the current block as a motion prediction candidate and/or a merge candidate.

In some embodiments, the method further comprising: accessing a sub-unit block of the neighboring affine coded block twice by using motion vector prediction list construction procedure and/or merge candidate list construction procedure; fetching motion vector stored in the sub-unit blocks as a motion prediction candidate and/or a merge candidate; and fetching derived motion vector prediction from the neighboring affine coded block for the current block as an extra motion vector prediction candidate or merge candidate.

In some embodiments, the extra motion vector prediction candidate or the merge candidate is added to the motion prediction candidate list or the merge candidate list after candidate fetched from the sub-unit block, or before candidate fetched from the sub-unit block, or after all normal spatial candidates but before temporal candidates, or after the temporal candidates, or adaptively changed from block to block.

In some embodiments, total number of the extra motion vector prediction candidates or merge candidates derived from the affine coded block does not exceed a fixed number.

In some embodiments, the fixed number is dependent on coded information including the following: size of candidate list, total number of available motion candidates before adding these extra candidates, block size, block type, coded mode and slice type.

In some embodiments, the candidates and/or the extra candidates derived from the affine coded block are pruned with other candidates.

In some embodiments, the derived candidate is not added into the list if it is identical to another candidate already in the list.

In some embodiments, the extra candidate is compared with the motion vector fetched from the sub-unit block.

In some embodiments, the derived candidates are compared with other derived candidates.

In some embodiments, the method further comprising: determining dimensions of the current block; applying motion vector prediction derived from the current non-affine coded block from the neighboring affine coded block based on the determination.

In some embodiments, not applying motion vector prediction in response the determination that width of the current block is greater than a predetermined integer and high of the current block is greater than the predetermined integer, or the width of the current block is greater than the predetermined integer or the high of the current block is greater than the predetermined integer, or the width of the current block is less than the predetermined integer and the high of the current block is less than the predetermined integer, or the width of the current block is less than the predetermined integer or the high of the current block is less than the predetermined integer.

In some embodiments, the conversion comprises reconstructing the current block from the bitstream representation.

In some embodiments, the conversion comprises generating the bitstream representation from the current block.

FIG. 13 is a flowchart representation of a method 1300 of video coding. The method 1300 includes using (1302), during a conversion between a current block of video and a bitstream representation of the current block, affine model for the current block; wherein the affine model uses a representative point which is shifted from a center of a sub-block within the current block.

In some embodiments, the sub-block comprises M×N pixels, where M and N are integers, and the representative point is set to ((M>>1)−0.5, (N>>1)−0.5), or ((M>>1)−0.5, (N>>1)), or ((M>>1), (N>>1)−0.5), or ((M>>1)+0.5, (N>>1)), or ((M>>1), (N>>1)+0.5), or ((M>>1)+0.5, (N>>1)+0.5).

In some embodiments, when coordinate of a left-top corner of a sub-block relative to a top-left sample of the current block is (xs, ys), the coordinate of the representative point is defined to be (xs+1.5, ys+1.5).

In some embodiments, motion vector for the representative point is derived by using the coordinate of the representative point.

In some embodiments, an additional offset (0.5, 0.5) or (−0.5, −0.5) or (0, 0.5), or (0.5, 0), or (−0.5, 0), or (0, −0.5) is added to the representative points.

In some embodiments, the method further comprising: aligning one or multiple stored motion information of the current block with corresponding motion information used for motion compensation of the current block.

In some embodiments, the one or multiple stored motion information which are at sub-block corner are replaced by the corresponding motion information which are at sub-block center used for motion compensation of the current block.

Figure 14:
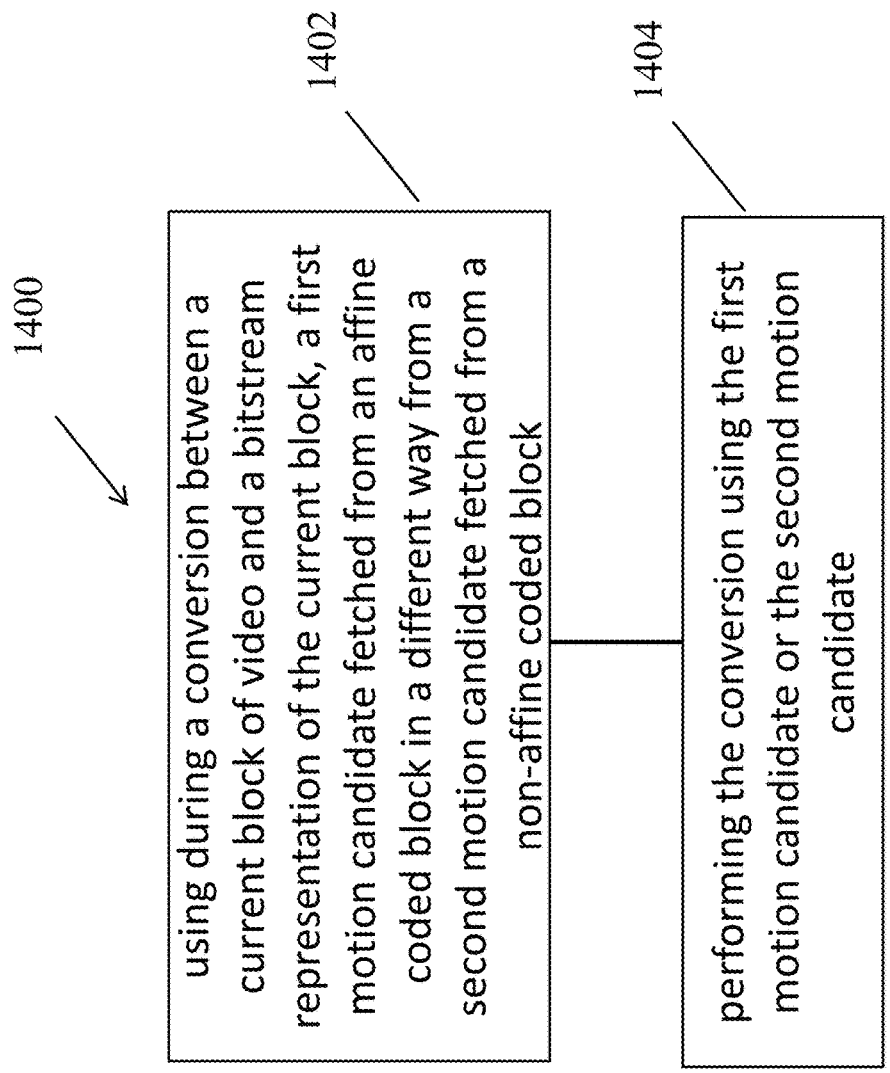
FIG. 14 is a flowchart for another example method of video processing.

FIG. 14 is a flowchart representation of a method 1400 of video coding. The method 1400 includes using (1402), during a conversion between a current block of video and a bitstream representation of the current block, a first motion candidate fetched from an affine coded block in a different way from a second motion candidate fetched from a non-affine coded block; and performing (1404) the conversion using the first motion candidate or the second motion candidate.

In some embodiments, the first and second motion candidates are motion vector prediction candidates for motion vector prediction mode or a merge candidate.

In some embodiments, the first motion candidate is not put into motion candidate list or merge candidate list.

In some embodiments, the first motion candidate is put into motion candidate list or merge candidate list at a lower priority than the second motion candidate.

In some embodiments, the first motion candidate is put at a more posterior position in the motion candidate list or the merge candidate list.

Figure 15:
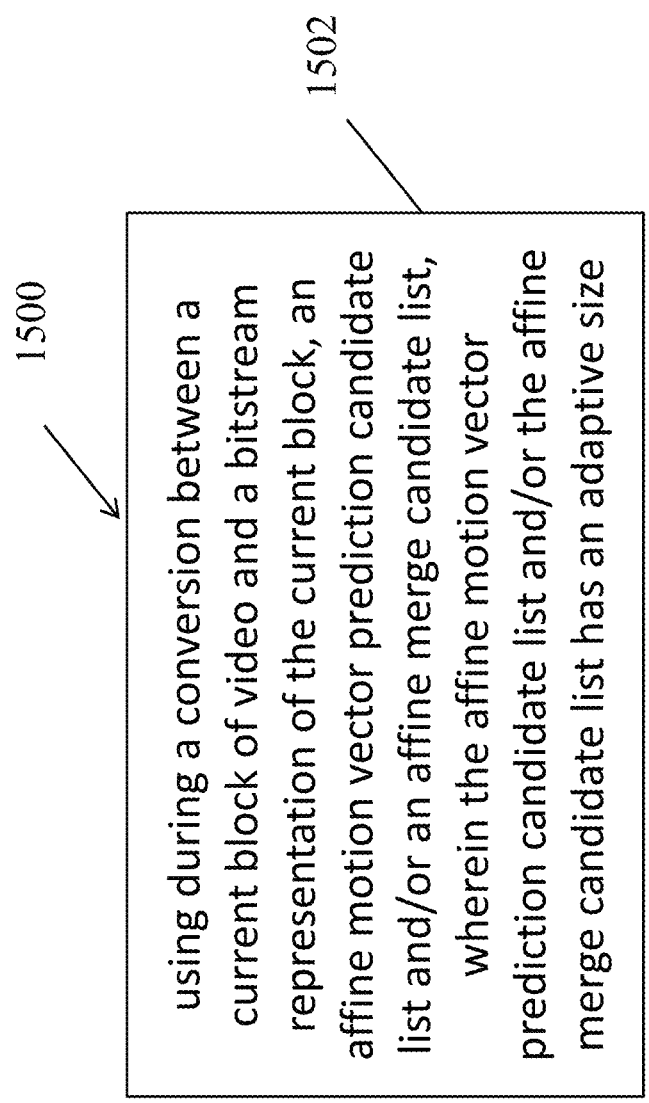
FIG. 15 is a flowchart for another example method of video processing.

FIG. 15 is a flowchart representation of a method 1500 of video coding. The method 1500 includes using (1502), during a conversion between a current block of video and a bitstream representation of the current block, an affine motion vector prediction candidate list and/or an affine merge candidate list, wherein the motion vector prediction candidate list and/or the affine merge candidate list has an adaptive size.

In some embodiments, the size of the affine motion vector prediction candidate list and/or the affine merge candidate list is adaptive based on a size of the current block.

In some embodiments, the size of the affine motion vector prediction candidate list and/or the affine merge candidate list is proportional to the size of the current block.

In some embodiments, the size of the affine motion vector prediction candidate list and/or the affine merge candidate list is adaptive based on coding mode of one or multiple spatial or temporal neighboring blocks.

In some embodiments, the size of the affine merge candidate list is proportional to a number of spatial neighboring blocks that are affine coded.

Figure 16:
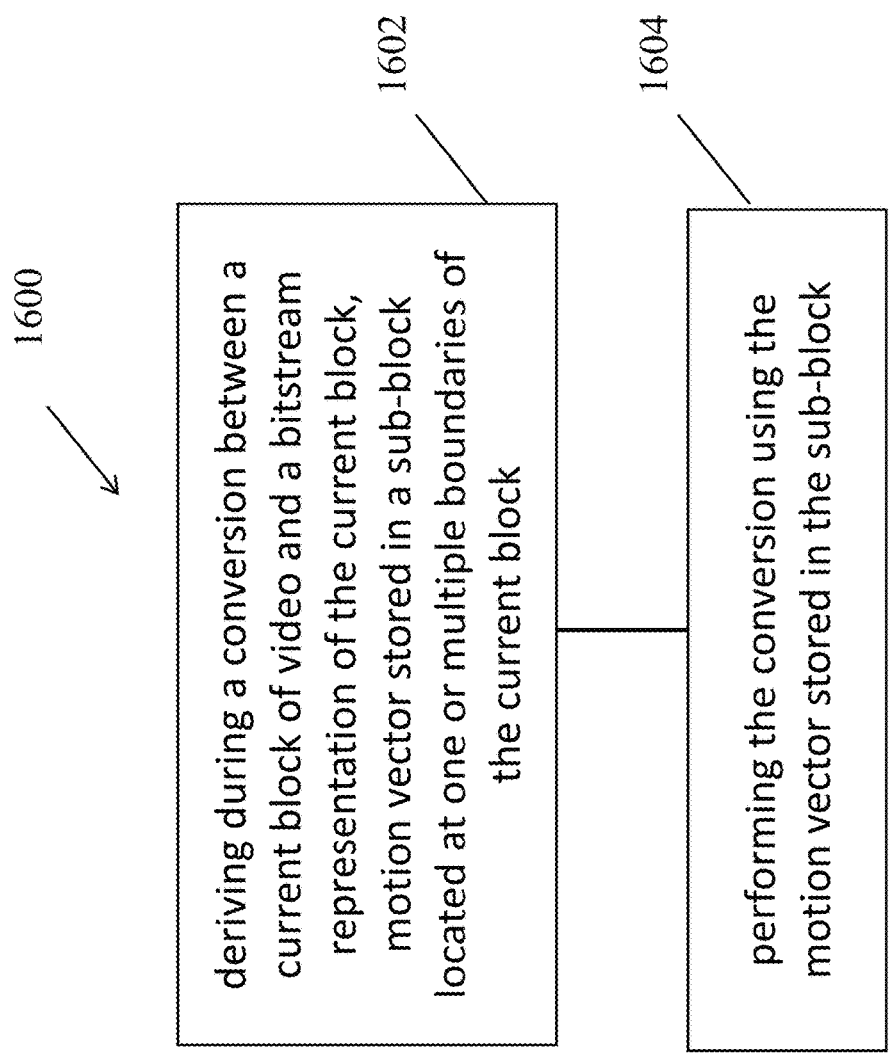
FIG. 16 is a flowchart for another example method of video processing.

FIG. 16 is a flowchart representation of a method 1600 of video coding. The method 1600 includes deriving (1602), during a conversion between a current block of video and a bitstream representation of the current block, motion vector stored in a sub-block located at one or multiple boundaries of the current block; and performing (1604) the conversion using the motion vector stored in the sub-block.

In some embodiments, the one or multiple boundaries of the current block include right boundary and/or the bottom boundary of the current block.

In some embodiments, the motion vector stored in the sub-block located at one or multiple boundaries of the current block is derived by using affine model with a representative point outside the sub-block.

In some embodiments, the motion vector stored in the sub-block located at one or multiple boundaries of the current block is derived by using a 4-parameter affine model or a 6-parameter affine model.

In some embodiments, the method further comprising: determining position of the sub-block; and determining coordinate of a representative point relative to coordinate of a top-left corner of the current block based on the position of the sub-block, wherein the sub-block comprises M×N pixels, where M and N are integers.

In some embodiments, in response to the determination that the sub-block is at the right boundary, the coordinate of the representative point relative to coordinate of the top-left corner of the sub-block is set to (M+M/2, N/2) so as to determine the coordinate of the representative point relative to the coordinate of the top-left corner of the current block.

In some embodiments, in response to the determination that the sub-block is at the bottom boundary, the coordinate of the representative point relative to coordinate of the top-left corner of the sub-block is set to (M/2, N+N/2) so as to determine the coordinate of the representative point relative to the coordinate of the top-left corner of the current block.

In some embodiments, in response to the determination that the sub-block is at bottom-right corner of the current block, the coordinate of the representative point relative to coordinate of the top-left corner of the sub-block is set to (M+M/2, N/2), (M/2, N+N/2) or (M+M/2, N+N/2) so as to determine the coordinate of the representative point relative to the coordinate of the top-left corner of the current block.

In some embodiments, in response to the determination that the sub-block is at the right boundary, the coordinate of the representative point relative to coordinate of the top-left corner of the sub-block is set to (M/2, N/2) so as to determine the coordinate of the representative point relative to the coordinate of the top-left corner of the current block.

In some embodiments, in response to the determination that the sub-block is at the bottom boundary, the coordinate of the representative point relative to coordinate of the top-left corner of the sub-block is set to (M/2, N/2) so as to determine the coordinate of the representative point relative to the coordinate of the top-left corner of the current block.

In some embodiments, in response to the determination that the sub-block is at the bottom boundary, the coordinate of the representative point relative to coordinate of the top-left corner of the sub-block is set to (M, N) so as to determine the coordinate of the representative point relative to the coordinate of the top-left corner of the current block.

In some embodiments, in response to the determination that the sub-block is at the right boundary, the coordinate of the representative point relative to coordinate of the top-left corner of the sub-block is set to (M, N) so as to determine the coordinate of the representative point relative to the coordinate of the top-left corner of the current block.

In some embodiments, in response to the determination that the sub-block is at the bottom boundary, the coordinate of the representative point relative to coordinate of the top-left corner of the sub-block is set to (0, N) so as to determine the coordinate of the representative point relative to the coordinate of the top-left corner of the current block.

In some embodiments, in response to the determination that the sub-block is at the right boundary, the coordinate of the representative point relative to coordinate of the top-left corner of the sub-block is set to (M, 0) so as to determine the coordinate of the representative point relative to the coordinate of the top-left corner of the current block.

In some embodiments, in response to the determination that the sub-block is at the bottom right corner, the coordinate of the representative point relative to coordinate of the top-left corner of the sub-block is set to (M, N) so as to determine the coordinate of the representative point relative to the coordinate of the top-left corner of the current block.

In some embodiments, the conversion comprises reconstructing the current block from the bitstream representation.

In some embodiments, the conversion comprises generating the bitstream representation from the current block.

Figure 17:
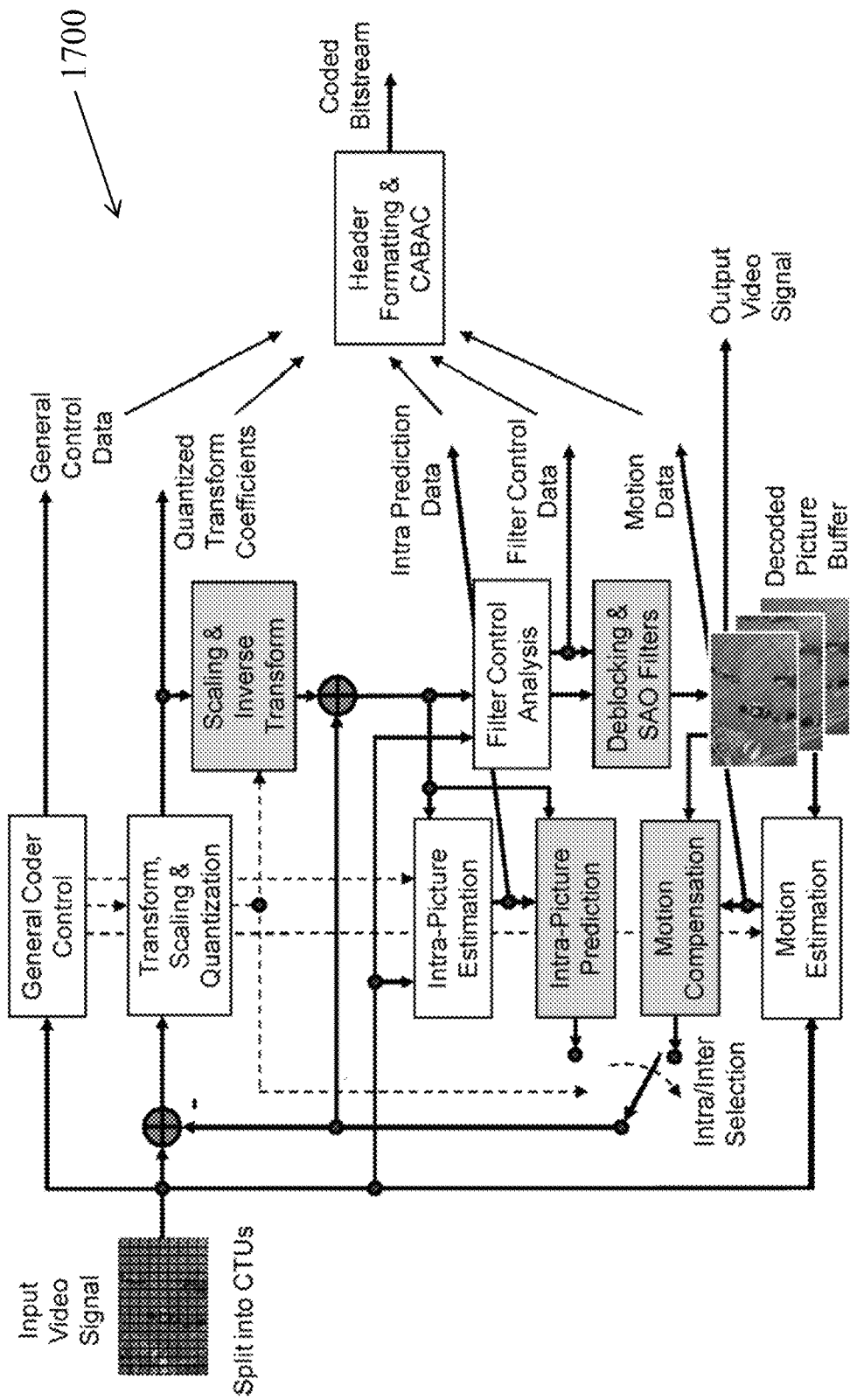
FIG. 17 shows an example block diagram of a typical High Efficiency Video Coding (HEVC) video encoder and decoder.

FIG. 17 shows an example block diagram of a typical HEVC video encoder and decoder 1700. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 17) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (e.g., bitstream order) and the output order (e.g., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a current block of video and a bitstream of the video, motion information of the current block in response to an affine mode being applied to the current block;
   updating the motion information of the current block after motion compensation to obtain updated motion information of the current block;
   performing a block filtering operation using un-updated motion information; and
   using the updated motion information during conversion of subsequent video blocks in a current slice, a current tile, or other pictures and their respective bitstream,
   wherein a motion vector information stored in a sub-block located at a right boundary of the current block or a bottom boundary of the current block includes two sets of motion vectors comprising a first set of motion vectors that is used for deblocking filtering and/or temporal motion prediction and a second set of motion vectors that is used for motion prediction of a subsequent prediction unit or a subsequent coding unit in a current picture as the current block.

2. The method of claim 1, wherein the subsequent video blocks are in a different picture from a picture of the current block.

3. The method of claim 1, further including:
   performing a block filtering operation using the updated motion information, wherein the block filtering operation includes a deblocking filtering operation.

4. The method of claim 1, wherein updating motion information of the current block includes updating motion information for a portion of the current block including only right or bottom affine sub-blocks of one coding unit.

5. The method of claim 1, wherein a motion vector stored in a sub-block located at a right boundary or a bottom boundary of the current block is different from a motion vector used in motion compensation for the sub-block, and wherein the motion vector stored in the sub-block located at the right boundary or the bottom boundary is used as motion vector prediction or candidate during the conversion of subsequent video blocks in current frame or different frame and their respective bitstream.

6. The method of claim 1, wherein updating motion information of the current block excludes sub-blocks at a right boundary or a bottom boundary of the current block.

7. The method of claim 6, wherein for the sub-block at a top-right corner of the current block, motion vector at the top-right corner derived from an affine model is always stored; or
   wherein for the sub-block at a bottom-left corner of the current block, motion vector at the bottom-left corner derived from an affine model is always stored; or
   wherein for the sub-block at a bottom-left corner of the current block, motion vector at the bottom-left corner derived from an affine model is stored when the motion vector is a signaled motion vector; or
   wherein for the sub-block at a bottom-right corner of the current block, motion vector at the bottom-right corner derived from an affine model is always stored.

8. The method of claim 1, wherein the conversion comprises decoding the current block from the bitstream.

9. The method of claim 1, wherein the conversion comprises encoding the current block into the bitstream.

10. An apparatus for processing video data comprising a processor and a non-transitory memory with instructions thereon, wherein the instructions upon execution by the processor, cause the processor to:
    determine, for a conversion between a current block of video and a bitstream of the video, motion information of the current block in response to an affine mode being applied to the current block;
    update the motion information of the current block after motion compensation to obtain updated motion information of the current block;
    perform a block filtering operation using un-updated motion information; and
    use the updated motion information during conversion of subsequent video blocks in a current slice, a current tile, or other pictures and their respective bitstream,
    wherein a motion vector information stored in a sub-block located at a right boundary of the current block or a bottom boundary of the current block includes two sets of motion vectors comprising a first set of motion vectors that is used for deblocking filtering and/or temporal motion prediction and a second set of motion vectors that is used for motion prediction of a subsequent prediction unit or a subsequent coding unit in a current picture as the current block.

11. A non-transitory computer-readable recording medium storing a bitstream of a video which is generated by a method performed by a video processing apparatus, wherein the method comprises:
    determining, for a conversion between a current block of video and a bitstream of the video, motion information of the current block in response to an affine mode being applied to the current block;

updating the motion information of the current block after motion compensation to obtain updated motion information of the current block;
performing a block filtering operation using un-updated motion information; and
generating the bitstream using the updated motion information for subsequent video blocks in a current slice, a current tile, or other pictures,
wherein a motion vector information stored in a sub-block located at a right boundary or a bottom boundary includes two sets of motion vectors including a first set of motion vectors that is used for deblocking filtering and/or temporal motion prediction and a second set of motion vectors that is used for motion prediction of a subsequent prediction unit or a subsequent coding unit in a current picture as the current block.

* * * * *